US012595349B2

(12) United States Patent
Coe

(10) Patent No.: US 12,595,349 B2
(45) Date of Patent: *Apr. 7, 2026

(54) ANTIFERROMAGNETIC STRAIN RECOVERY INDUCED PHOTON PULSE INITIATING BOND CLEAVAGE IN CROSS-LINKED RUBBER STRUCTURES

(71) Applicant: William B. Coe, Wrightwood, CA (US)

(72) Inventor: William B. Coe, Wrightwood, CA (US)

( * ) Notice: Subject to any disclaimer, the term of this patent is extended or adjusted under 35 U.S.C. 154(b) by 602 days.

This patent is subject to a terminal disclaimer.

(21) Appl. No.: 17/905,573

(22) PCT Filed: Mar. 3, 2021

(86) PCT No.: PCT/US2021/020726
§ 371 (c)(1),
(2) Date: Sep. 2, 2022

(87) PCT Pub. No.: WO2021/178575
PCT Pub. Date: Sep. 10, 2021

(65) Prior Publication Data
US 2023/0127284 A1        Apr. 27, 2023

Related U.S. Application Data

(60) Provisional application No. 63/119,458, filed on Nov. 30, 2020, provisional application No. 63/106,210, filed on Oct. 27, 2020, provisional application No. 62/985,427, filed on Mar. 5, 2020.

(51) Int. Cl.
| | |
|---|---|
| *C08J 11/16* | (2006.01) |
| *B29B 7/00* | (2006.01) |
| *B60C 1/00* | (2006.01) |
| *C08K 9/02* | (2006.01) |
| *B29K 21/00* | (2006.01) |
| *B29K 509/00* | (2006.01) |

(52) U.S. Cl.
CPC .............. *C08J 11/16* (2013.01); *B29B 7/007* (2013.01); *B60C 1/0016* (2013.01); *B60C 1/0025* (2013.01); *C08K 9/02* (2013.01); *B29K 2021/006* (2013.01); *B29K 2509/00* (2013.01); *C08J 2309/06* (2013.01); *C08J 2317/00* (2013.01)

(58) Field of Classification Search
USPC ............................................................. 521/41
See application file for complete search history.

(56) References Cited

U.S. PATENT DOCUMENTS

| | | | | |
|---|---|---|---|---|
| 5,258,413 A | * | 11/1993 | Isayev ..................... | C08C 19/08 |
| | | | | 264/912 |
| 5,602,186 A | * | 2/1997 | Myers ...................... | C08J 11/16 |
| | | | | 521/41 |
| 6,992,116 B2 | * | 1/2006 | Benko ...................... | C08J 11/16 |
| | | | | 521/42.5 |
| 10,626,275 B2 | | 4/2020 | Coe | |
| 10,662,320 B2 | | 5/2020 | Coe | |
| 10,800,906 B2 | | 10/2020 | Coe | |
| 2014/0206781 A1 | | 7/2014 | Fan et al. | |
| 2015/0005400 A1 | | 1/2015 | Kalliopuska et al. | |
| 2015/0247020 A1 | | 9/2015 | Sekhar | |

FOREIGN PATENT DOCUMENTS

| | | | | | |
|---|---|---|---|---|---|
| EP | | 2895539 A1 | * | 7/2015 | .............. B01J 8/087 |
| WO | WO 8605192 | | * | 9/1986 | |

OTHER PUBLICATIONS

Anthony, 2006, Technology to separate rubber crumb from fiber, Applied Engineering in Agriculture, 22(4):563-570.
International Search Report and Written Opinion dated Jun. 23, 2021 in application No. PCT/US2021/020726.

* cited by examiner

*Primary Examiner* — Terressa Boykin
(74) *Attorney, Agent, or Firm* — Knobbe, Martens, Olson & Bear, LLP

(57) ABSTRACT

Crumb rubber obtained from recycled tires is subjected to a process involving photodissociation to break a sulfur bond, sulfur-sulfur and/or sulfur-carbon bonds. The process utilizes a component that generates photonic energy upon being subjected to a compressing force (e.g., pressure). The photonic energy is bandwidth resonant with the sulfur-sulfur and/or sulfur-carbon bond, causing the bond to break apart. The resulting rubber is suitable for use in applications typically utilizing virgin rubber, such as new tires, engineered rubber articles, and asphalt rubber for use in waterproofing and paving applications.

42 Claims, 30 Drawing Sheets

SBR1502 Baseline-Raw PTR (2:1) vs. SBR1502 Baseline-Stage 2 PTR (2:1)

S' @ 20min = 24.61 dNm

S'_max = 24.90 dNm

S' @ 20min = 16.02 dNm

S'_max = 16.28 dNm

S' @ 15min = 24.12 dNm

S' @ 15min = 15.64 dNm

S' @ 10min = 22.55 dNm

S' @ 10min = 14.59 dNm

S'_min Stage 2 PTR = 3.12 dNm

S'_min Raw PTR = 3.04 dNm

Legend:
- S' Raw PTR
- S' Stage 2 PTR
- S" Raw PTR
- S" Stage 2 PTR

Time [min]

Baseline-CMPXL(1:2) Pull Testing

ASTM D638V Dog Bone @0.1mm/sec

| Strain % Range | Youngs Modulus (Mpa) |
|---|---|
| 0-1% | 5.0 |
| 1-2% | 5.0 |
| 2-3% | 5.0 |
| 3-4% | 4.0 |
| 4-5% | 4.0 |
| 5-10% | 3.0 |
| 10-20% | 2.0 |
| 20-45% | 2.0 |

Stress- Strain Curve to 10% Strain

$Y = 3E+06x + 65250$
$R^2 = 0.9967$ $Y = 4E+06x + 27499$
$R^2 = 0.9798$ $Y = 4E+06x + 45259$
$R^2 = 0.974$ $Y = 5E+06x + 13469$
$R^2 = 0.9878$ $Y = 5E+06x + 254.29$
$R^2 = 0.9891$ $Y = 5E+06x + 3593.1$
$R^2 = 0.9862$

Stress- Strain Curve

$Y = 2E+06x + 249079$
$R^2 = 0.9997$ $Y = 2E+06x + 162886$
$R^2 = 0.9976$ $Y = 4E+06x + 31409$
$R^2 = 0.986$

Baseline-SMPXL(2:1) Pull Testing

ASTM D638V Dog Bone @0.1mm/sec

Baseline-CMPXL(1:2) Temp Sweep

Baseline-CMPXL(1:2) Temp Sweep 80C, 0.1% Strain @ 10Hz

- —△— Storage Modules $E'$ (MPa)
- —□— Loss Modules $E''$ (MPa)
- —◆— Complex Stiffiness (N/mm)
- —○— Tan(Delta) tan($\delta$)

33.30 °C, 8.69652 MPa

Storage Modules $E'$(MPa)
Mean = 6.34907
SD = 1.41131
Rel. SD= 0.222286
Var. = 1991790   79.20 °C, 4.25770 MPa Tan(Delta) tan($\delta$)
Mean = 0.145649
SD = 0.0181063
Rel. SD = 0.124315
Var. = 3.27838e-4

Loss Modulus $E''$(MPa)
Mean = 0.941122
SD = 0.294463
Rel. SD = 0.312885
Var. = 86708.4

Complex Stiffness(N/mm)
Mean = 10.1938
SD = 2.28227
Rel. SD = 0.223889
Var. = 5.20876

Temperature $T$ (°C)

FIG. 25

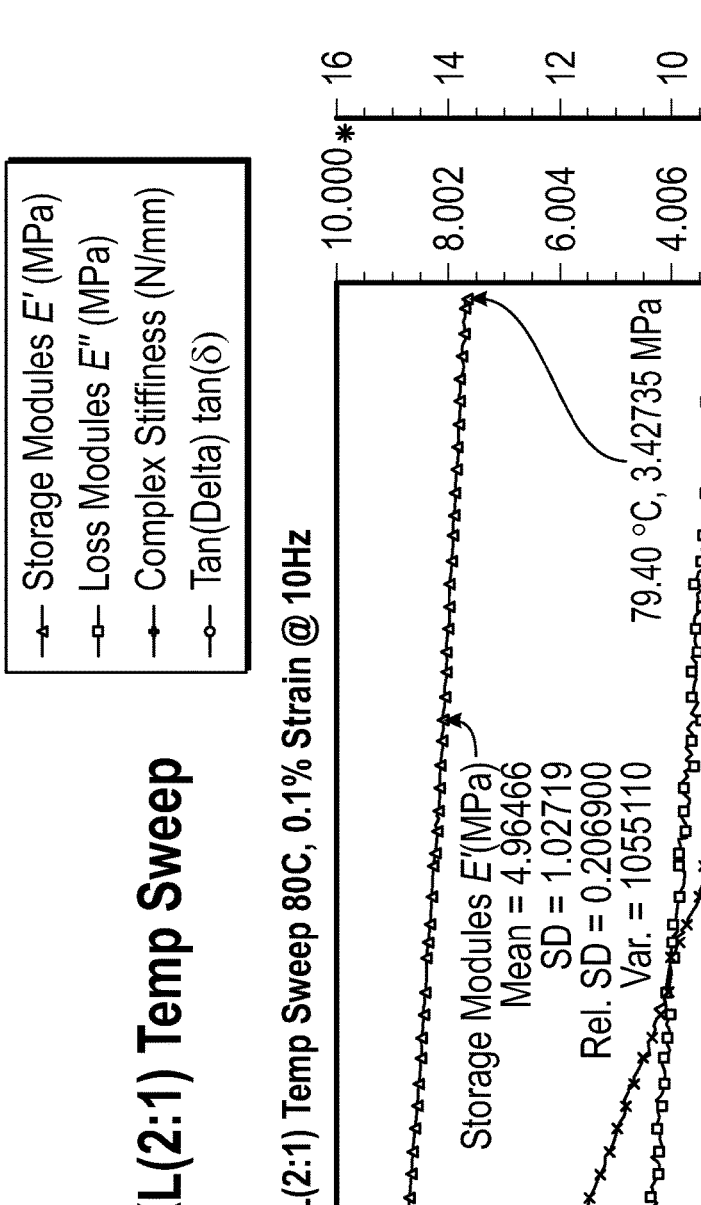
Baseline-CMPXL(2:1) Temp Sweep
FIG. 26

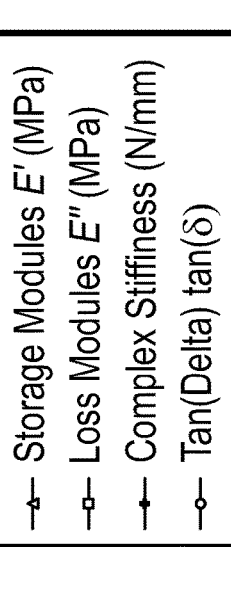
Baseline-SMPXL(1:2) Temp Sweep
Baseline-SMPXL(1:2) Temp Sweep 80C, 0.1% Strain @ 10Hz
- Storage Modules *E'* (MPa)
- Loss Modules *E"* (MPa)
- Complex Stiffness (N/mm)
- Tan(Delta) tan(δ)
24.70°C, 18.3465 MPa
Storage Modules *E'*(MPa)
Mean = 13.5078
SD = 2.81417
Rel. SD = 0.208337
Var. = 7919560
78.60 °C, 9.26494 MPa
Loss Modulus *E"*(MPa)
Mean = 1.85788
SD = 0.510876
Rel. SD = 0.274978
Var. = 260994
Complex Stiffness(N/mm)
Mean = 14.6706
SD = 3.07409
Rel. SD = 0.209541
Var. = 9.45005
Tan(Delta) tan(δ)
Mean = 0.135717
SD = 9.62088e-3
Rel. SD = 0.0708891
Var. = 9.25613e-5
**Temperature *T* (°C)**
FIG. 27

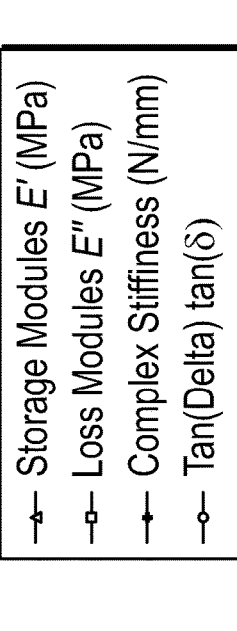

Baseline-SMPXL(2:1) Temp Sweep

Baseline-SMPXL(2:1) Temp Sweep 80C, 0.1% Strain @ 10Hz

Storage Modules $E'$(MPa)
Mean = 7.284496
SD = 1.42839
Rel. SD = 0.196074
Var. = 2040290

79.10 °C, 5.09887 MPa 24.40 °C, 9.74154 MPa

Loss Modulus $E''$(MPa)
Mean = 0.953064
SD = 0.228114
Rel. SD = 0.239348
Var. = 52035.9

Tan(Delta) tan($\delta$)
Mean = 0.129861
SD = 6.78178e-3
Rel. SD = 0.0522235
Var. = 4.59925e-5

Complex Stiffness(N/mm)
Mean = 13.4679
SD = 2.64993
Rel. SD = 0.196759
Var. = 7.02214

Temperature $T$ (°C)

Storage Modules $E'$ (MPa)
Loss Modules $E''$ (MPa)
Complex Stiffness (N/mm)
Tan(Delta) tan($\delta$)

FIG. 28

Baseline-SMPXL(2:1)Run#2 Temp Sweep

SMPXL(100%) Temp Sweep 8

SMPXL(100%) Temp Sweep 80C, 0.1% Strain @ 10Hz

Storage Modules $E'$ (MPa)

Loss Modules $E''$ (MPa)

Complex Stiffiness (N/mm)

Tan(Delta) tan($\delta$)

27.80 °C, 25.5831 MPa 79.00 °C, 15.5050 MPa

Storage Modules $E'$(MPa)
Mean = 19.9140
SD = 3.23297
Rel. SD = 0.162347
Var. = 1.04521e7

Loss Modulus $E''$(MPa)
Mean = 2.39290
SD = 0.655749
Rel. SD = 0.274039
Var. = 430007

Tan(Delta) tan($\delta$)
Mean = 0.118131
SD = 0.0133276
Rel. SD = 0.112821
Var. = 1.77624e-4

Temperature $T$ (°C) Complex Stiffiness(N/mm)
Mean = 24.8906
SD = 4.07982
Rel. SD = 0.163910
Var. = 16.6449

FIG. 30

ANTIFERROMAGNETIC STRAIN RECOVERY INDUCED PHOTON PULSE INITIATING BOND CLEAVAGE IN CROSS-LINKED RUBBER STRUCTURES

INCORPORATION BY REFERENCE TO RELATED APPLICATIONS

Any and all priority claims identified in the Application Data Sheet, or any correction thereto, are hereby incorporated by reference under 37 CFR 1.57. This application is the U.S. National Phase of International Application No. PCT/US2021/020726 filed Mar. 3, 2021, which claims the benefit of U.S. Provisional Application No. 62/985,427, filed Mar. 5, 2020, U.S. Provisional Application No. 63/106,210, filed Oct. 27, 2020, and U.S. Provisional Application No. 63/119,458, filed Nov. 30, 2020. Each of the aforementioned applications is incorporated by reference herein in its entirety, and each is hereby expressly made a part of this specification.

FIELD

Crumb rubber obtained from recycled tires is subjected to a process involving photodissociation to break sulfur-sulfur and/or sulfur-carbon bonds. The process utilizes a component that generates photonic energy upon being subjected to a compressing force (e.g., pressure). The photonic energy is bandwidth resonant with the sulfur-sulfur and/or sulfur-carbon bond, causing the bond to break apart. The resulting rubber is suitable for use in applications typically utilizing virgin rubber, such as new tires, engineered rubber articles, and asphalt rubber for use in waterproofing and paving applications.

BACKGROUND

In 2015, end-use markets consumed 87.9% percent by weight of the scrap tires generated in the U.S. The total volume of scrap tires consumed in end use markets in the U.S. reached approximately 3551 thousand tons of tires. RMA estimates that about 4038 thousand tons of tires were generated in the U.S. in 2015. Of those tires, 25.8% were used to produce ground rubber, 48.6% for tire derived fuel, 11.4% were land disposed, 7.0% were used in civil engineering, and 7.1% went to miscellaneous uses (0.7% to electric arc furnace, 1.3% to reclamation projects, 2.6% were exported, and 2.6% went to other uses). In 1990, only eleven percent of tires were consumed on a per tire basis. Positive end-use market results in 2015 were primarily the result of high rates of TDF use and lower exports. In the long term, the need to expand all economically viable and environmentally sound markets for scrap tires is still an imperative. Scrap tires were consumed by a variety of scrap tire markets, including tire-derived fuel, civil engineering and ground rubber applications. Other smaller markets and legal landfilling consumed the remaining annually-generated tires.

Key scrap tire markets include tire derived fuel, ground rubber, civil engineering and other markets. In tire derived fuel applications, scrap tires are used as a cleaner and more economical alternative to coal as fuel in cement kilns, pulp and paper mills and industrial and utility boilers. Ground rubber applications utilize approximately 1020 thousand tons of scrap tires, or over 25 percent of the volume of scrap tires generated each year. Ground rubber is produced by grinding scrap tires into size defined pieces. Ground rubber applications include new rubber products, playground and other sports surfacing and rubber-modified asphalt. Ground rubber also includes larger pieces of rubber used as landscaping mulch, and loose fill playground material. The playground and mulch market was the most dynamic segment in the ground rubber market during this period. The asphalt market uses ground rubber to modify the asphalt binder used in road paving, resulting in quieter, more durable roads. The civil engineering market consumes approximately 274 thousand tons of tires per year, about 7.7 percent of the total tires to market, and consists of tire shreds used in road and landfill construction, septic tank leach fields, alternative daily cover and other construction applications. Additional smaller markets for scrap tires exist that consume approximately 7% of annually generated scrap tires. These markets include tires consumed in electric arc furnaces (steel manufacturing), professionally engineered tire bales and products punched, pressed, or stamped from scrap tires. Total tire rubber consumed in ground rubber markets is about 1.36 billion pounds. The total scrap tires diverted to these ground rubber markets is about 1.02 million tons (62 million tires). The percent of total pounds of ground rubber consumed in the market in 2015 is as follows: sport surfaces 25%, playground mulch 22%, molded/extruded products 35%, asphalt 15%, automotive uses 2%, and export 1%.

Stockpiles of scrap tires historically began to be created around the 1960s and 1970s when tires were diverted from landfills, but recycling markets for them were not functional. Stockpiles proved to be prone to catastrophic fires which created air and water pollution.

Worldwide rubber tire production is responsible for generating approximately 99% of worldwide, end-of-life (EOL) tire scrap. About 1.1 billion scrap tires are generated annually, corresponding to roughly 12 million tons of scrap tire. Due to the punishing physical properties required of a new tire, tires embody a carefully engineered weaving together of steel and fiber cords with a mineral and carbon-filled rubber blend, all cross linked to a highly tenacious structure. The EOL tire is challenging to breakdown to its original essential elements. The potentially highest value component—the rubber—is particularly difficult to reclaim, due to the vulcanization process it is subjected to. As a result, EOL tires that are no longer suitable for use on vehicles due to wear or irreparable damage are typically either subject to pyrolysis (e.g., to generate energy for use in cement manufacturing), or ground up to be used as filler (e.g., in asphalt pavement, new tires, construction or landscaping materials).

SUMMARY

While extensive research efforts over many years have been devoted to development of methods for devulcanizing vulcanized rubber, e.g., tire rubber, the first method for recovery or transformation of tire rubber into a commercially viable product having properties similar to virgin composite rubber was reported in PCT Publ. No. WO 2018/200340, PCT Publ. No. WO 2019/135815, and PCT Publ. No. WO 2019/028286. The present methods provide an improvement to this process, enabling the process to be conducted with substantially greater efficiency and much greater cost effectiveness, and resulting in a superior product.

One of the objects of the methods described herein is to process, with greater efficiency, vulcanized rubber products or other cross linked rubber containing products, e.g., as found in end-of-life (EOL) rubber tires, into a form suitable for use as a raw material in the fabrication of articles of manufacture that would conventionally be fabricated from virgin rubber subjected to vulcanization, e.g., new tires or other vulcanized rubber products. The vulcanized rubber subjected to the methods described herein is typically provided as a conventionally available, 30 mesh, end-of-life, ground tire rubber particle (GTRP).

The Joint Research Council (JRC) for the EC recently published a Critical Raw Material (CRM) study in December 2017 listing 27 materials subject to supply disruption; a disruption that would result in significant loss of economic sustainability. Natural rubber (NR) was listed as one of the 27 materials. The process disclosed herein can provide up to 70% of the natural rubber gap referred to in the CRM study.

In a first aspect, a method for preparing a rubber-based elastomer is provided, comprising: subjecting a mixture comprising vulcanized rubber particles and an antiferromagnetic material to a pressure, then releasing the pressure, whereby a sulfur-sulfur bond or a sulfur-carbon bond of the vulcanized rubber is cleaved, whereby a rubber-based elastomer is obtained.

In an embodiment of the first aspect, the pressure is from 100-400 megapascals, wherein when the pressure is released photonic energy of a wavelength of from 500 to 200 nanometers is generated in a vicinity of the sulfur-sulfur bond or the sulfur-carbon bond.

In an embodiment of the first aspect, a sulfur-sulfur bond is cleaved.

In an embodiment of the first aspect, a sulfur-carbon bond is cleaved.

In an embodiment of the first aspect, the antiferromagnetic material comprises a metal selected from the group consisting of Co, Cu, Ni, Zn, and Mn.

In an embodiment of the first aspect, the antiferromagnetic material comprises a rare earth element.

In an embodiment of the first aspect, the antiferromagnetic material comprises a copper oxide, a cobalt oxide, a magnesium oxide, or a manganese oxide.

In an embodiment of the first aspect, the antiferromagnetic material comprises KNiF, SrNiF, or BaTiO.

In an embodiment of the first aspect, the antiferromagnetic material comprises copper acetate.

In an embodiment of the first aspect, the antiferromagnetic material has a crystalline structure, wherein upon application of the pressure a 90 degree non-stress geometry of the antiferromagnetic material is distorted to up to a 135 degree fully stressed geometry.

In an embodiment of the first aspect, the mixture comprises 0.01% by weight or less water.

In an embodiment of the first aspect, the antiferromagnetic material comprises a copper oxide.

In an embodiment of the first aspect, the antiferromagnetic material is copper acetate.

In an embodiment of the first aspect, the vulcanized rubber crumbs have a particle size greater than 200 mesh.

In an embodiment of the first aspect, the antiferromagnetic material is employed at a concentration of from 0.01% to 0.5% by weight of the mixture.

In an embodiment of the first aspect, the antiferromagnetic material is employed at a concentration of 0.5% by weight of the mixture.

In an embodiment of the first aspect, the antiferromagnetic material is dry coated on the vulcanized rubber particles.

In an embodiment of the first aspect, the antiferromagnetic material is sputtered onto the vulcanized rubber particles.

In an embodiment of the first aspect, the antiferromagnetic material is laser sputtered onto the vulcanized rubber particles.

In an embodiment of the first aspect, the antiferromagnetic material is plasma coated onto the vulcanized rubber particles.

In an embodiment of the first aspect, the antiferromagnetic material is supported on a supporting particle.

In an embodiment of the first aspect, the supporting particle has a surface area of 50 m²/g to 1000 m²/g.

In an embodiment of the first aspect, the supporting particle is selected from the group consisting of an oxide, a metal, a refractory material, a ceramic, or a glass.

In an embodiment of the first aspect, the supporting particle is porous.

In an embodiment of the first aspect, the supporting particle is amorphous silica, e.g., having a surface area of 160 m²/g.

In an embodiment of the first aspect, the antiferromagnetic material is deposited on the supporting particle by sputtering, laser sputtering, laser ablation, e-beam evaporation, physical or chemical vapor deposition, plasma enhanced chemical vapor deposition, evaporative deposition, reactive deposition, atomic layer deposition, or plasma coating.

In an embodiment of the first aspect, pressure is applied by passing the mixture through a multi-lobe, co-rotating mixer extruder.

In an embodiment of the first aspect, pressure is applied by passing the mixture between two rollers.

In an embodiment of the first aspect, the mixture passes between the two rollers from 3 to 100 times.

In an embodiment of the first aspect, the mixture passes between the two rollers from 3 to 10 times.

In an embodiment of the first aspect, the mixture passes between the pinch rollers from 3 to 5 times.

In an embodiment of the first aspect, the mixture further comprises one or more of a virgin rubber or a virgin elastomer or a synthetic rubber.

In an embodiment of the first aspect, the two rollers have a nip of 0.007 inches to about 0.050 inches.

In an embodiment of the first aspect, one of the two rollers rotates faster than the other.

In an embodiment of the first aspect, one of the two rollers rotates faster than the other, optionally up to 1.15 times faster than the other.

In an embodiment of the first aspect, one of the two rollers rotates faster than the other, optionally up to 1.15 times faster than the other.

The method of any of the aforementioned Claims, wherein one of the two rollers has a variable speed of from 5 to 150 rpm.

In an embodiment of the first aspect, the two rollers have a variable speed of from 5 to 150 rpm.

In a second aspect, an elastomer prepared by the method of the first aspect or any of its embodiments is provided.

In an embodiment of the second aspect, the elastomer is subjected to crosslinking.

In an embodiment of the second aspect, the elastomer is fabricated into a rubber-containing article.

In an embodiment of the second aspect, the article is a new tire.

In an embodiment of the second aspect, the article is an engineered rubber article.

DESCRIPTION OF THE DRAWINGS

FIG. 25 provides temperature sweep testing data for Baseline:CMP-XL (1:2).

FIG. 26 provides temperature sweep testing data for Baseline:CMP-XL (2:1)

FIG. 27 provides temperature sweep testing data for Baseline:SMP-XL (1:2).

FIG. 28 provides temperature sweep testing data for Baseline:SMP-XL (2:1).

FIG. 30 provides temperature sweep testing data for SMP-XL.

DETAILED DESCRIPTION OF THE EMBODIMENTS

Figure 1:
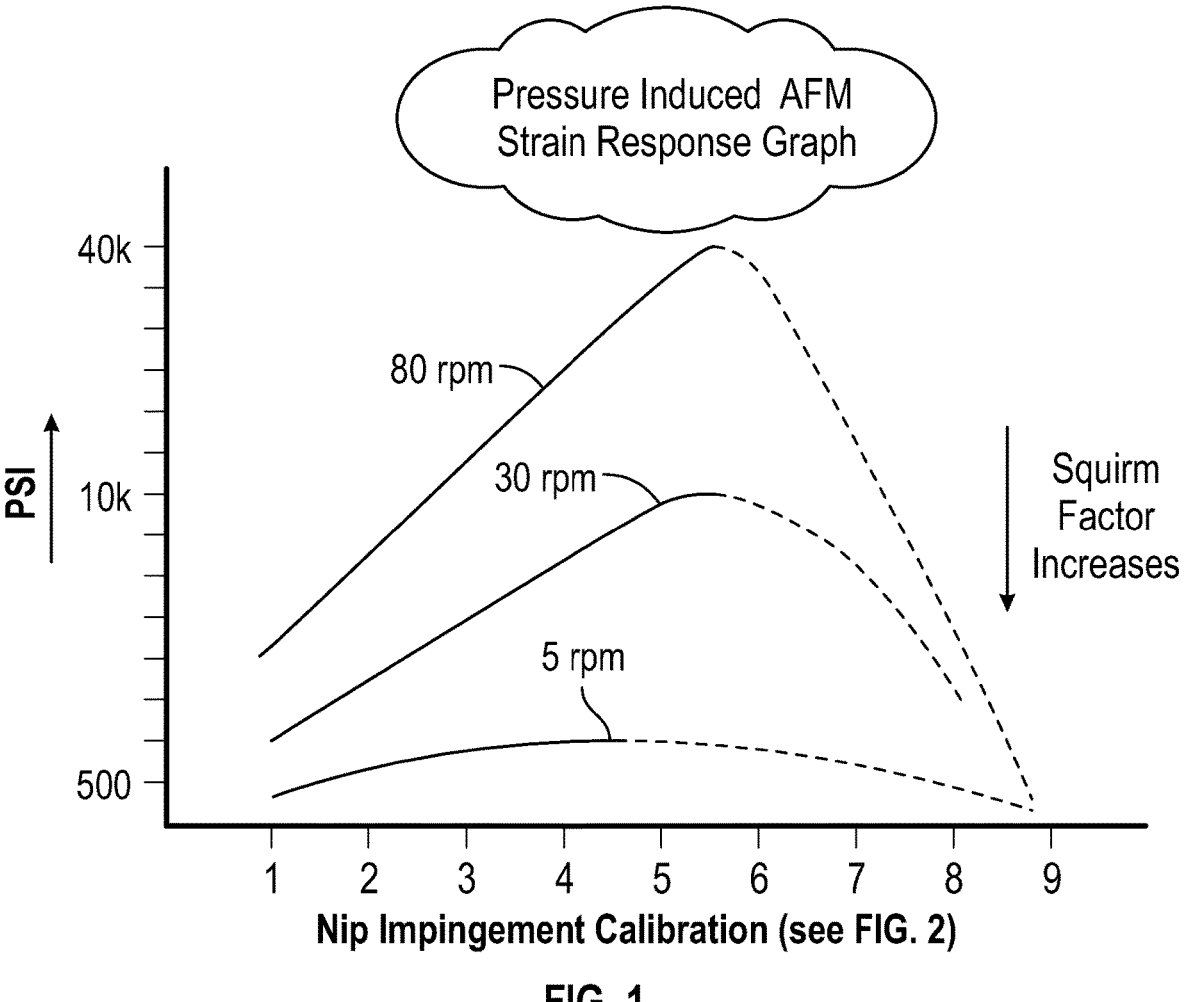
FIG. 1 is a diagram depicting a pressure induced antiferromagnetic (AFM) strain response graph. The y axis corresponds to applied pressure (in psi). The x axis corresponds to a nip impingement calibration for a nip of approximately 0.015 inches.
Figure 2:
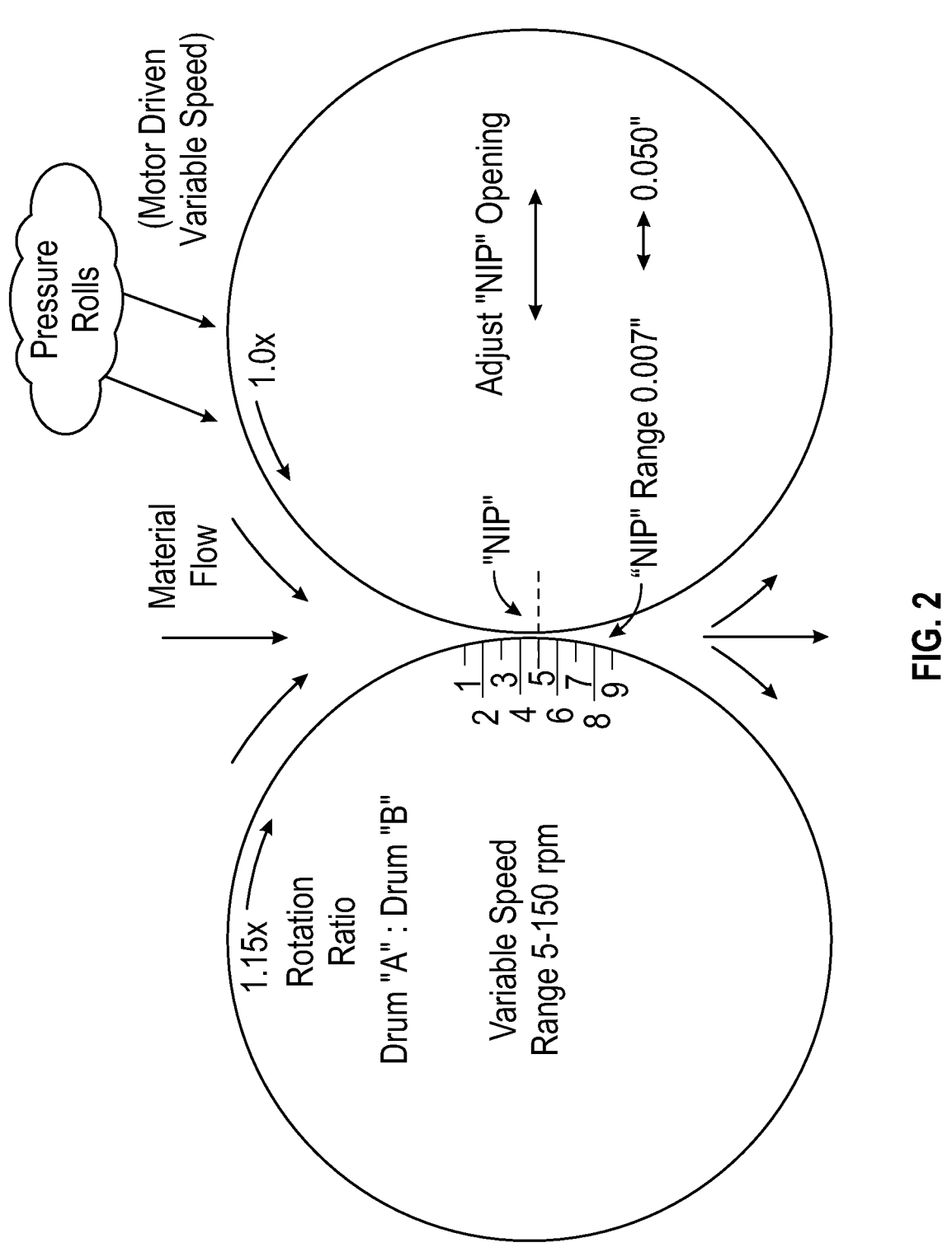
FIG. 2 is a diagram depicting a pair of rollers through which the mixture of AFM material and vulcanized rubber particles pass. The nip ranges from 0.007 inches to 0.050 inches over the nip impingement calibration region (corresponding to numbers 1-9).
Figure 3:
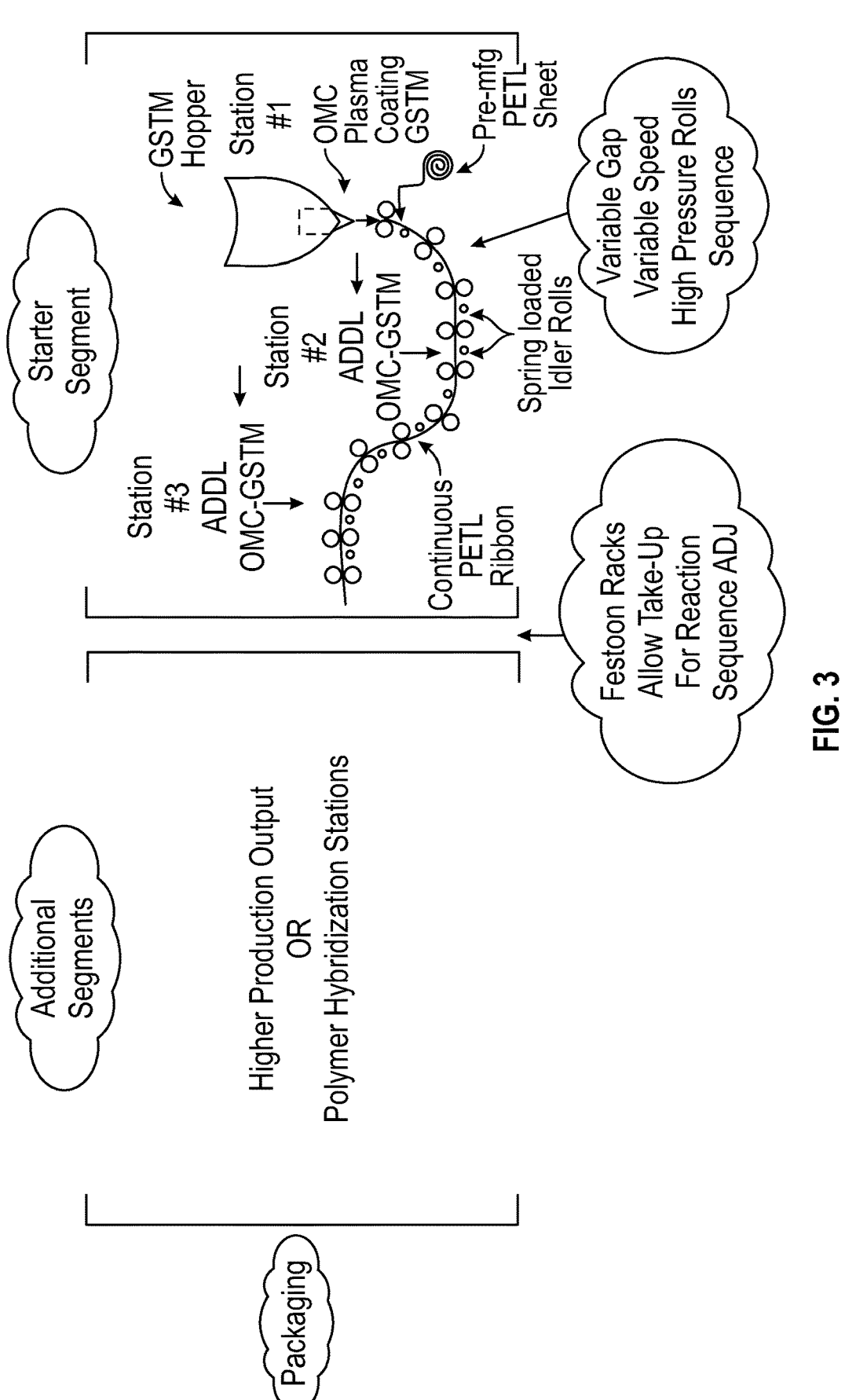
FIG. 3 is a diagram depicting a polymer extruded tire laminate (PETL) production schematic. In the starter segment, ground scrap tire moiety (GSTM) is fed out of a hopper and plasma coated with the AFM material (in this example, an organic metallic compound (OMC)). The coated material is applied to a pre-manufactured sheet of PETL, which is fed through a series of paired rollers (variable gap, variable speed, high pressure). The PETL ribbon is supported by spring loaded idler rolls. Additional OMC-GSTM mixture is applied to the PETL ribbon at two other stations along the series of paired rollers. The resulting continuous PETL ribbon is fed to festoon racks, allowing take-up for reaction sequence adjustment. Additional segments can be provided, e.g., for higher production output or polymer hybridization stations. The resulting product can be packaged for later use.

The following description and examples illustrate an embodiment of the present invention in detail. Those of skill in the art will recognize that there are numerous variations and modifications of this invention that are encompassed by its scope. Accordingly, the description of an embodiment should not be deemed to limit the scope of the present invention.

INTRODUCTION

An ambient, end of life (EOL), ground tire rubber (GTR) particle in the size range of approx. 600 microns (30 mesh), also referred to as a ground scrap tire moiety (GSTM), has a cross section composed of either the old tire tread or the tire side wall or a combination of the two. It may be generally characterized as a heterogeneous matrix of an interpenetrating, cross linked, elastomer network filled with inorganic substances, primarily carbon. Depending upon whether it is primarily tire tread or sidewall in origin the primary entangled elastomers will be natural rubber (NR) or styrene butadiene/butadiene rubber (BR S-BR), with the BR and S-BR typically having the larger mass component in the tread for better wear and the sidewall having an NR bias for improved flexural qualities. The crosslink may generally be described as elemental sulfur and/or a complex compound incorporating sulfur as its principal element, e.g., a polysulfidic chemical.

During tire construction the interpenetrating elastomer networks are formed using a sequential crosslink of the predominant elastomer (NR or S-BR) followed by the crosslink of the secondary elastomer, such that the secondary elastomer is "bent" to conform to the already vulcanized, higher strength primary elastomer. This technique imparts mechanical characteristics that are retained in the individual GTR particle.

A single vehicle tire, after being stripped of steel and fiber reinforcement will yield approximately sixteen pounds (16 lbs) of reusable GTR, with truck tires yielding more. Over one billion EOL tires are generated worldwide annually. About 50% are consumed as low value fuel. Where possible, maximizing the reuse of this raw material for its proven mechanical properties represents a substantial challenge, but, to the extent achieved, a resource recovery value of as much as 200:1 is observed when comparing its possible re-use in new tire construction to being consumed in a furnace for its BTU content.

Notably, recent detailed studies of the environmental advantages such a reversal of EOL-GTR usage, maximized, predicts that atmospheric carbon contribution might be reduced by the equivalent of shutting down 14 coal fired power plants (300,000 rail cars of coal) or removing six million vehicles from the roads or planting an additional 62 million acres of forests (equivalent to an area the size of the state of Arizona) for carbon sequestration. Accordingly, one object of the methods and compositions discussed herein is to prepare the GTR particle so that it may be integrated into the full spectrum of industrial rubber goods manufactured worldwide.

Unassisted, elemental sulfur will slowly crosslink functional rubber polymers, but the process is too slow and has too many end property difficulties to be a commercially realistic alternative to a commercially successful vulcanization. Vulcanization as discussed herein regards an accelerated sulfur vulcanization process as is practiced in commercial vulcanization.

Sulfur vulcanization was discovered by Charles Goodyear in 1839. After 178 years of development, it is universally agreed that the processes are complex which result in the formation of the transverse sulfuric bridge between adjacent, interpenetrating rubber polymers. These bridges in turn yield mechanical properties in an elastomeric material which are critical to civilization. However, much progress has been made and many, definitive elements of the progression are well established.

While a free-radical mechanism had long been assumed to be the controlling phenomena, more recently, with the advent of more advanced methods of discreet process characterization, a convincing presence has not been detected of the primary, theoretical radicals necessary to validate that mechanism. In contrast, an ionic mechanism has been predicted and validated using similar advanced process characterization methods. Since the modern vulcanization process involves many chemical components being mixed together at the start of the process, each (combination) with its own chemical reaction pathway, it is likely that both radical and ionic mechanisms are active but analysis reveals that the ionic mechanism is predominant.

A typical example (by wt. %) of an NR-BR tire compound is: NR 80%, BR 20%, ZnO 5%, steric acid 2%, silica-talc 3%, carbon black 55%, aromatic oil 10%, elemental sulfur 1.7%, N-Cyclohexyl-2-benzothiazole sulfenamide (CBS—an accelerator) 1.2%, 2-(4-Morpholinothio)-benzothiazole (MBS—an accelerator) 1.1%, and N-tert-butyl-2-benzothiazole sulfenamide (TBBS—an accelerator) 1.1%.

The process begins in a heated mold, after the tire recipe components have been thoroughly distributed and dispersed. The vulcanization process may be seen in three sequential events: 1) formation of the accelerator complex chemistry, 2) formation of the crosslink precursor, and 3) completion of the crosslink.

Conventional Usage of Scrap Rubber in Tire

Excluding the rubber trimmings generated prior to the final heating and cross linking of new tires, it is estimated that less than 0.004% by weight of all EOL tires are reincorporated into a new tire master batch. Such reincorporation has been successfully accomplished at master batch loadings for passenger car tires of up to 3% by weight utilizing very fine, cryogenically processed ground rubber obtained from EOL tires. A loading of EOL tire-derived processed ground rubber greater than this has thus far not been feasible, in that the physical properties required of new tire applications are not met at higher loading levels. Tire production typically begins with a base formula of components, with the base formula developed by selection of raw material(s). This is then reduced to a master batch in high shear mixing equipment. Typically, the master batch is done in two phases: the master pass and the finish pass. The master pass combines various rubber species which are introduced as small bales or sheets and are blended with fine powders of carbon black and minerals, as well as a small quantity of process oil(s). This step is performed at the high temperature required to lower the viscosity of the rubber elements such that the flow-resistant powder elements can be uniformly distributed in sufficiently small clusters or packets. These clusters or packets can then be subsequently dispersed to a minimal particle size. The finish pass is done at a lower temperature and usually under process conditions that create more of a smearing action of the heterogeneous elements. In the finish pass, rubber polymers are not further degraded by high temperatures as in the master pass, and the uniformly distributed agglomerates of powder components are worked into such small physical size that they become dispersed within the free molecular space of the rubber elements. Once the finish pass is completed, the master batch bales are ejected from the mixer and rolled into thin sheets (referred to as milling). The milled sheets are used to lay up, on specialized forming equipment, the tire carcass prior to being placed in a compression molding press for final crosslinking by thermal and/or chemical means.

Crosslinking accelerants include mercapto group or sulfur-based (e.g., elemental sulfur and/or, accelerator derivatives of N-tert-butyl-2-benzothizolesulfenamide (TBBS)). The sulfur-based crosslinking agents which react with sites in the master batch at or above a prescribed temperature may be partially introduced at both the master pass and the finish pass phase. The crosslinking during the final heating of the tire carcass causes the reactive sites in the various rubber elements to build a sufficient crosslink density to achieve the final physical properties required to meet the sustained load and heat environment to which the tire will be subjected.

Rubber from End-of-Life Tire Scrap

Rubber-containing crumb is manufactured from two primary feedstocks: tire buffings, a byproduct of tire retreading, whole tire, and scrap tire rubber. Scrap tire rubber comes from three types of tires: passenger car tires; truck tires; and off-the-road tires. End product yields for each of these tire types are affected by the tire's construction, strength, and weight. On average, 10 to 16 pounds of end-of-life tire crumb can be derived from one passenger tire. Other sources of rubber-containing crumb include products containing or made using recycled rubber-containing crumb, e.g., new rubber products, playground surfacing, rubber mulch, drainage aggregate, construction fill material, scraps from manufacturing, and the like.

Tires are composite structures containing a number of components. The tire carcass is composed of the tread, bead, sidewall, shoulder, and ply. Tires are formed from components such as natural and/or synthetic rubber, cords, and filler. The polymer most commonly employed for the tread and encasement of the cords is a blend of NR and S-BR copolymer. Cords form the ply and bead of the tire, and provide tensile strength necessary to contain the inflation pressure. Cords can comprise steel, natural fibers such as cotton or silk, and synthetic fibers such as nylon or Kevlar.

Fillers can include silica and carbon black. A representative tire can comprise one or more of: synthetic rubber, natural rubber, sulfur and sulfur-containing compounds, silica, phenolic resin, oil (aromatic, naphthenic, and/or paraffinic), fabric (polyester, nylon, etc.), petroleum waxes, pigments (zinc oxide, titanium dioxide, etc.), carbon black, fatty acids, miscellaneous inert materials, and steel wire.

The typical passenger tire comprises 14% natural rubber, 27% synthetic rubber, 28% carbon black, 14-15% steel, and 16-17% fabric, fillers, accelerators, antiozonants, and other miscellaneous components. The average weight of a new passenger car tire is 25 lbs., and for a scrap passenger tire 22 lbs. Truck tires typically contain 27% natural rubber, 14% synthetic rubber, 28% carbon black, 14-15% steel, and 16-17% fabric, fillers, accelerators, antiozonants, and other miscellaneous components. The average weight of a new truck tire is 120 lbs., and for a scrap truck tire 110 lbs. Other types of tires can contain higher amounts of synthetic and/or natural rubber, e.g., 70% (by weight) rubber, 15% steel, 3% fiber, and 12% of other materials such as inert fillers. Rubber is found in tire components including tread, innerliner, beads, belts, and the like. The percent rubber by weight in a new passenger tire is typically as follows: 32.6% in tread; 1.7% in base, 21.9% in sidewall, 5.0% in bead apex, 1.2% in bead insulation, 11.8% in fabric insulation; 9.5% in insulation of steel cord, 12.4% in innerliner, and 3.9% in undercushion.

The rubber compounds employed in a typical tire, along with associated materials, are set forth in Table 1. The methods described herein are suitable for processing tire tread, base, sidewall, as well as innerliner, and are also suitable for processing other materials containing vulcanized (or otherwise cross linked) natural rubber, styrene-butadiene rubber, and isobutylene-isoprene rubber. As further described herein, the other components, e.g., carbon black, present in EOL tire or other vulcanized-rubber containing articles of manufacture may in some embodiments remain in the rubber subjected to the processes described herein, with no processing conducted to impact the properties or amounts of the other component(s). In other embodiments, the rubber may be subjected to further processes to enrich or minimize these additional components, or change their properties.

TABLE 1

|  | Tread (PHR) | Base (PHR) | Sidewall (PHR) | Innerliner (PHR) |
|---|---|---|---|---|
| Natural Rubber | 50.0 | 100.0 | 75.0 |  |
| Styrene-Butadiene Rubber | 50.0 |  | 25.0 |  |
| Isobutylene-Isoprene Rubber |  |  |  | 100.0 |
| Carbon Black (Grade N110) | 50.0 | 15.0 | 20.0 |  |
| Carbon Black (Grade N330) |  | 25.0 | 35.0 |  |
| Carbon Black (Grade N765) |  |  |  | 50.0 |
| Processing Oil | 7.5 | 5.0 | 5.0 | 3.0 |
| Antioxidant | 1.0 | 0.75 | 1.0 | 1.0 |
| Antioxidant Wax |  |  | 2.0 |  |
| Stearic Acid | 2.0 | 4.0 | 3.0 | 1.5 |
| Zinc Oxidant | 5.0 | 5.0 | 5.0 | 5.0 |
| Accelerator (High) |  | 1.0 | 0.7 |  |
| Accelerator (Middle) | 1.25 |  |  | 0.4 |
| Accelerator (Low) |  |  |  | 0.4 |
| Sulfur | 2.5 | 3.0 | 2.8 | 2.0 |

*PHR = Per Hundred Rubber, parts on a weight basis
*Carbon grade = ASTM grading: Particle size and structure of carbon are different.

There are approximately 2.5 pounds of steel belts and bead wire in a passenger car tire. This material is made from high carbon steel with a nominal tensile strength of 2750 MN/in$^2$. The steel tire cord composition of a typical tire is set forth in Table 2.

TABLE 2

|  | Steel Belts | Bead Wire |
|---|---|---|
| Carbon | 0.67-0.73% | 0.60% min. |
| Manganese | 0.40-0.70% | 0.40-0.70% |
| Silicon | 0.15-0.03% | 0.15-0.30% |
| Phosphorus | 0.03% max. | 0.04% max. |
| Sulfur | 0.03% max. | 0.04% max. |
| Copper | Trace | Trace |
| Chromium | Trace | Trace |
| Nickel | Trace | Trace |
| Coating | 66% Copper | 98% Brass |
|  | 34% Zinc | 2% Tin |

Whole tires can be ground to yield rubber particles mixed with other components of the tire. Methods for producing rubber containing particles from tires are known in the art. The used tires (or shreds or granules thereof) can be subjected to an optional cleaning step (e.g., a water wash). Tires can be recycled by subjecting them to an initial shredding step, then subjecting the shreds to a granulation process to yield an initial granulate having dimensions of 1-3 cm. Grinding can be conducted under ambient conditions (e.g., in a granulator or a cracker mill) or cryogenic conditions.

Ambient grinding is a multi-step processing technology that uses a series of machines (usually three) to separate the rubber, metal, and fabric components of the tire. Whether using granulation equipment or cracker mills, the first processing step typically reduces the original feedstock to small chips. The second machine in the series will grind the chips to separate the rubber from the metal and fabric. Then a finishing mill will grind the material to the required product specification. After each processing step, the material is classified by sifting screens that return oversize pieces to the granulator or mill for further processing. Magnets are used throughout the processing stages to remove wire and other metal contaminants.

In the final stage, fabric is removed by air separators. Rubber particles produced in the granulation process generally have a cut surface shape and rough texture, with similar dimensions on the cut edges.

Cracker mills use two large rotating rollers with serrations cut in one or both of them. The roll configurations are what make them different. These rollers operate face-to-face in close tolerance at different speeds. Product size is controlled by the clearance between the rollers. Cracker mills are low speed machines operating at about 30-50 RPM. The rubber usually passes through two to three mills to achieve various particle size reductions and further liberate the steel and fiber components. These mills do not have screens built into the mill and as such the mill itself does not control the final particle. A stand-alone screening system will separate "sized" particles from oversize granules following the mill and re-circulate the oversize products. The particles produced by the cracker mill are typically long and narrow in shape and have a high surface area.

Cryogenic processing uses liquid nitrogen or other materials/methods to freeze tire chips or rubber particles prior to size reduction. Most rubber becomes embrittled or "glass-like" at temperatures below −80° C. The use of cryogenic temperatures can be applied at any stage of size reduction of scrap tires. Typically, the size of the feed material is a nominal 2 inch chip or smaller. The material can be cooled in a tunnel style chamber, immersed in a "bath" of liquid nitrogen, or sprayed with liquid nitrogen to reduce the temperature of the rubber or tire chip. The cooled rubber is size-reduced in an impact type reduction unit, centrifuge, or hammer mill. This process reduces the rubber to particles ranging from ¼ inch minus to 30 mesh, with the majority of the particle distribution between ¼ inch minus and 20 mesh. A typical throughput is 4,000 to 6,000 pounds per hour. Cryogenic grinding avoids heat degradation of the rubber and produces a high yield of product that is free of almost all fiber or steel, which is liberated during the process.

Wet grinding, is a processing technology used to manufacture particles that are 40 mesh and finer. The wet grind process mixes partially refined crumb rubber particles with water creating a slurry. This slurry is then conveyed through size reduction and classification equipment. When the desired size is achieved, the slurry is conveyed to equipment for removing the majority of the water and then drying. Aside from the use of water, the same basic principles that are used in an ambient process are utilized in a wet grinding process. The major advantage for a wet grind process is the ability to create fine mesh crumb rubber. While products as coarse as 40 mesh are produced, the majority of the particles are 60 mesh and finer. A percentage of the overall throughput is finer than 200 mesh. Another advantage for a wet grind process is the cleanliness and consistency of the crumb rubber produced. The process washes the crumb rubber particles. The wet process removes the fine particles of fiber from the crumb rubber making a very clean product.

The initial granulate contains steel, rubber, and textile components. The steel is typically recovered using a multi-stage magnetic separation process to minimize the loss of rubber. This can entail a first step utilizing a high strength twin pole overband cross belt separator magnet to remove metal containing particles in a first step. The second step involves a magnetic drum separator or magnetic pulley utilizing high strength rare earth magnets. The axial magnetic field causes the metal containing particles to tumble and release entrapped rubber. For fine rubber material that is fed into a powder grinder, a plate magnet suspended close to the product over the conveyor can lift and remove fine wire fragments. Testing can be conducted to determine metal content, e.g., by using a magnetometer.

The fiber can be recovered using modified gin machinery as known in the textile industry. A two step process is typically employed, where clean fiber is removed from EOL tire crumb using a modified gin cylinder cleaner (used in the textile industry to remove foreign matter from seed cotton). Partially cleaned crumb is subjected to a second step to remove fiber, which can still contain some rubber particles. The resulting cleaned EOL tire crumb is then collected for packaging or other use. See, e.g., W. Stanley Anthony, Applied Engineering in Agriculture, Vol. 22(4): 563-570.

American Society for Testing and Materials (ASTM) has standards for specifying different size ranges of crumb rubber, such as 30 mesh or 80 mesh. The range of particle sizes can be determined by sieve analysis, consisting of shaking and tapping a measured quantity of a crumb rubber sample through a specified number of test sieves over a specified time. The amount of sample retained on each screen is weighed and results are given as the percentage of sample retained on each screen. The recommended procedure for sieve analysis using the Rotap method is provided in ASTM 5644. Typical crumb rubber sizes directed to certain products and uses include the following: molded and extruded products, 4-100 mesh; asphalt modification, 16-40 mesh; sport surfacing, ¼"-40 mesh; automotive products, 10-40 mesh; tires, 80-100 mesh; rubber and plastic blends, 10-40 mesh; and construction, 10-40 mesh.

There are no unified U.S. standards for processing EOL tire rubber crumb; however, a suitable EOL tire rubber crumb for use in interlinked substitution typically has a low fiber content (less than 0.02% of total weight), low metal content (less than 0.01% of total weight), high consistency, and the particles are preferably sized for 100% pass through 16 mesh. In some embodiments, it may be acceptable to have particles of larger size, e.g., 14, 12, or even 10 mesh. For example, 10-40 mesh crumb rubber (e.g., 30 mesh, or 25-35 mesh) yields satisfactory results when processed according to the methods described herein. Smaller particles, e.g., 41-200 mesh, can be employed and may enable more efficient interlinked substitution; however, a reduction in particle size will incur greater expense in manufacture of the crumb of the specified size. Larger particles, e.g., less than 10 mesh (4-9 mesh) can also be subjected to the methods, e.g., for particle size reduction purposes.

ASTM D5603 Standard Classification for Rubber Compounding Materials—Recycled Vulcanizate Particulate, classifies vulcanized particulate rubber according to maximum particle size, size distribution and parent materials including whole tires, tire peels, buffings generated from the tire tread and shoulder, buffings generated from tire tread, shoulder and sidewall and non-tire rubber.

End-of-Life Tire Crumb Characterization ELT crumb containing vulcanized rubber and having the desired particle sizes can be manufactured or obtained from any suitable commercial source.

The ELT crumb is typically of such a size that 100% can pass through a 16 mesh screen, and may have a narrow size distribution (e.g., no smaller than 20 mesh and no larger than 16 mesh) or may have a broader size distribution (e.g., significant contents of fines and various other particle sizes less than 16 mesh). The crumb rubber is typically cleaned of fiber and wire to a purity of 99.5 wt. % (i.e., 0.5 wt. % or less of fiber and wire).

If the sulfur content of the ELT crumb is unknown, representative samples of the ELT crumb can be tested to determine sulfur content (typically measured in parts per hundred weight), such that a controlled amount of reactant can be used in the extraction process, thereby avoiding overutilization or underutilization of reactant. A stoichiometric amount of reactant to sulfur is typically employed; however, larger or smaller amounts can also be advantageously employed. Any suitable method can be employed to determine the sulfur compound; however, a nitric compound extraction process can be advantageously employed. ASTM D4578 describes standard test methods to apply to rubber chemicals for determination of percent sulfur. These test methods cover the determination of solvent insoluble materials in a sulfur-containing sample. The two test methods are: (1) Test Method A, Extraction by Carbon Disulfide, and (2) Test Method B, Extraction by Toluene. If there are no other solvent insoluble materials present in the sulfur-containing sample, the test methods determine the insoluble sulfur content directly. If other materials are also present, additional testing is necessary to identify what portion of the insolubles (e.g., carbon black, silica, or other inert fillers) is insoluble sulfur.

Sulfur Crosslinking of Rubber

Elemental sulfur has cyclic eight atoms molecules at room temperature. In the presence of accelerators and activators, elemental sulfur generates sulfur fragments that react with reactive groups of rubbers in the process of interlinked substitution to create cross-links such as:

$$S_g \longrightarrow \text{'}S_X\text{'} \xrightarrow{\text{~~CH}_2-\text{CH}=\text{CH}-\text{CH}_2\text{~~}} HS_X{'} \; + \; \text{~~CH}-\text{CH}=\text{CH}-\text{CH}_2\text{~~}$$

$$\downarrow \text{'}S_X\text{'}$$

$$\text{~~CH}-\text{CH}=\text{CH}-\text{CH}_2\text{~~} \xleftarrow{\text{~~CH}_2-\text{CH}=\text{CH}-\text{CH}_2\text{~~}} \text{~~CH}-\text{CH}=\text{CH}-\text{CH}_2\text{~~}$$

$$\overset{|}{S_X} \qquad\qquad\qquad\qquad\qquad \overset{|}{S_X{'}}$$

$$\text{~~CH}_2-\text{CH}-\text{CH}-\text{CH}_2\text{~~} \qquad\qquad \downarrow \text{~~CH}_2-\text{CH}=\text{CH}-\text{CH}_2\text{~~}$$

$$\text{~~CH}-\text{CH}=\text{CH}-\text{CH}_2\text{~~}$$
$$\overset{|}{S_X}$$
$$\text{~~CH}-\text{CH}=\text{CH}-\text{CH}_2\text{~~}$$

Description of Phenomena and Process

Small quantities, typically less than 0.5%, of an antiferromagnetic material, such as certain molecular organic metallic compounds (OMCs) when introduced onto the surface of moisture-free (0.01% or less measurable water), ground scrap tire moieties (GSTM) (e.g., having a longest dimension of one centimeter or less) followed by the introduction of that OMC or AFM material coated, composite rubber moiety into a mechanically pressurized environment (pressure of about 100-400 megapascals) will, upon release of that pressure on the moiety to a near ambient pressure, receive bursts of energy from the distortion of the OMC or AFM material in a wavelength of from about 200 nm to 900 nm, e.g., 200 nm to 500 nm. When tuned to a wavelength of 260 to 230 nanometers, this energy is particularly effective in cleaving S—S bonds. The wavelength can be further tuned to cleave S—C bonds. A resulting tuning of the wavelength is affected by the rate of pressure increase and decrease multiplied by the pressure quanta.

Through repeated pulses of pressure and release therefrom, which can be accomplished in devices such as two roll rubber mills, crossbar-impinging-multi-lobe co-rotating mixer extruders, or the like, the OMC or AFM material is worked into the inner regions of the GSTM to generate scissioned, crosslink bonds, so as to release adjoining, inter-penetrating elastomer strands. Temperature, in the form of IR spectra radiation, can interfere with clean bursts so it is found that keeping the process at or below 90° C., e.g., 50° C., e.g., 0° C.-50° C., results in a more efficient process when compared to higher temperatures. Further, such process temperatures assist in maintaining minimum damage or activation to the surrounding GSTM matrix, which may include classes of materials such as natural rubber, butyl rubber, styrene-butadiene rubber, carbon black, talc, silica, sulfur, zinc oxide, nitrogen-based molecules, etc.

The molecular distortion during processing of the OMC or AFM takes it through two half cycles during which it passes through a quantum space (QS) twice. During this transition, referred to as over into a classic super position then back into a classic, relaxed geometry ("over-back"), a third phase occurs.

As the OMC or AFM passes through this QS, there is a momentary "measurement problem" as the molecule moves from-into-then-back into a well-defined (classic) result. The over-back is a third phase in this two cycle process during which quantum decoherence then coherence takes place. To be sure the spin frustration forces of decoherence have been resolved back to a stable state, a plug-and-play algorithm which integrates consideration of the Heisenberg Uncertainty Principal, Schrodinger's Equation and Feynman Diagrams predicts the wave function distribution in term of probable position, and momentum in this phase thereby resolves the measurement problem. This distinguishes the unique role of the OMC or AFM in the process.

The OMC (or AFM material)-GSTM surface coating application method may be accomplished by deposition methods, e.g., sputtering, laser sputtering, laser ablation, e-beam evaporation, physical or chemical vapor deposition, plasma enhanced chemical vapor deposition, evaporative deposition, reactive deposition, electrodeposition, atomic layer deposition, plasma coating the OMC or AFM material in a suitable atmosphere or environment, e.g., in an inert atmosphere or environment (e.g., vacuum, argon, nitrogen, or the like) directly onto the GSTM, followed by running the partially coated moiety through doctor rolls for greater distribution. An alternate method is to suspend or dissolve the OMC or AFM material in water or other suitable solvent, e.g., distilled or deionized water, ethanol, methanol, propyl alcohol, acetone, etc. (e.g., a 6.5% by weight mixture), followed by spraying the solution onto the GSTM at between 5-8% of solution mass on GSTM mass, then high speed mixing the slightly damp mixture to gain a consistent distribution onto the GSTM. This is followed by drying the mixture to remove all the water before proceeding to the high pressure, pulsed phase of the process.

In other methods, the OMC or AFM material is coated on a solid substrate which is then mixed with the GSTM, e.g., silica or other suitable solids. As an example of OMC or AFM deposited on silica, the finished surface architecture of the precipitated silica ($SiO_2$, surface area=160 m$^2$/g) is deliberately textured to accommodate a molecular sized OMC or AFM element which strongly adheres to the solid's surface in a distance in the range of hydrogen bonding due to an engineered polar attraction. This ensures the OMC or AFM does not 'butter' the EOL tire particle during the ultra-high compression cycles, thereby interfering with thorough processing of the crumb rubber particle throughout its full depth. A suitable coating of OMC or AFM on the solid substrate (e.g., OMC on silica) can be applied by sputter coating a layer approximately 5-10 nm of the OMC onto a $SiO_2$, dimpled particle. Other layer thicknesses may also be used, e.g., less than 5 nm to more than 10 nm, e.g., 1 nm to 100 nm, or 2 nm to 20 nm). Upon coating, this composite is then metered/mixed into an un-modified stream of ground tire rubber as a homogenous, dry maw. This homogeneous, dry maw is then forced, by a stuffing box, into a twin screw, counterrotating, extruder barrel where it is subjected to a pulsed, high compression, electro-mechanical and acoustic environment. The coated particle (OMC on $SiO_2$) acts as a semi-rigid photon-anvil moving into and out of the previously described distortion cycle and, at the end of the reactor excursion, remains substantially intact (as an embedded composite of OMC and silica) within the deepest regions of the then attrition-derived rubber particle. By providing the OMC or AFM in supported form, e.g., OMC as sputter deposited on a porous silica substrate, the OMC or AFM molecule is not in a floppy, unconstrained, unsupported form. Instead, a controlled geometric stature is imposed which facilitates the quantum processes described above.

It has been observed that if small amounts of remaining moisture are present, the efficiency of the process is notably reduced. For example, a 1.0% by weight moisture content will require two times as many pulses to achieve a breakdown of a 600 micron particle to a 1-5 micron particle. Accordingly, a moisture (water) content of 1.0% by weight or less is generally employed, e.g., 0.2-0.3% by weight, or 0.3% by weight or less, or 0.2% by weight or less, or 0.1% by weight or less, or 0.01% by weight or less, e.g., 0.3% to 0.001% by weight, in the mixture of OMC or AFM (supported or not) and the GSTM. Further moisture loss during this extra process effort is likely the change required for the cross-link cleavage to proceed, as moisture content testing after particle size reduction shows the moisture content to be near zero. Moisture can advantageously be removed by microwaving the product, or otherwise heating the product. In certain embodiments, a moisture content over 1.0% may be acceptable, depending upon the processing conditions.

Current empirical data suggests that this energy release, as described herein by a high pressure stress-strain upon the OMC or AFM material, creates a spin density at the 's' and 'p' orbitals, resulting in at least a superexchange electron hopping between the 'd' orbital(s) of neighboring OMC or AFM material molecules as the pressure distorts its respective crystalline structure from a 90 degree non-stress geometry to up to a 135 degree fully-stressed geometry. A uniform compression and release range of from about 50 to 500 milliseconds can be achieved with existing process equipment. Faster or slower rates multiplied by reasonably efficient methods of generating high compression are expected to yield improved process times to final target particle size.

Antiferromagnetic Materials

The antiferromagnetic materials such as OMCs can include organometallic compounds, such as organocopper complexes, e.g., copper acetate, or copper oxides, e.g., perovskites, as disclosed in FIG. 1 of Keimer et al., Nature, Vol. 518, 179, 12 Feb. 2015. The established record for conventional electron-phonon superconductors is 39K in $MgB_2$. Given the small Fermi energies, the Tc values found in the family of heavy fermion superconductors are actually remarkably high. There has been much interest in recent years in the new family of 'iron superconductors' in which Tc values approach 60K. The record holders are found in the copper oxide family, with a maximum Tc of 165K found in a 'mercury' copper oxide under pressure.

Also disclosed in Keimer is a highly crystalline copper(II) benzenehexathiolate coordination polymer (Cu-BHT) that is suitable for use.

Other antiferromagnetic compounds suitable for use include those disclosed in Table V of Baltz et al., Rev. Mod. Phys., Vol. 90, No. 1, January-March 2018, reproduced below:

Spin penetration depth and resistivity ($\rho$) for various antiferromagnetic materials. Finite-size effects on $\rho$ are reported when available. Unless specified otherwise, NiFe is close to $Y_3Fe_5O_{12}$. When not specified the investigation temperature was 300 K. CPP - GMR refer to perpendicular to plane excitation-giant magneroresistance detection, SP and SP ($\Delta$H) refer to ferromaganetic resonance spin pumping excitation-inverse spin Hall effect detection when not specified, and ferromagnetic resonance linewidth detection when ($\Delta$H) is specified, ST - FMR and ST - FMR(HR) refer to spin torque ferromagnetic resonance excitation induced by spin Hall effect as a result of an ac current flow-anisotropic magnetoresistance detection when not specified, and second harmonic response detection of the anomalous Hall effect and/or anisotropic magnetoresistance when (HR) is specified, and SSE refer to spin Seebeck excitation induced by a thermal gradient-inverse spin Hall effect detection.

| AF material | Spin penetration depth (nm) | $\rho(\mu\Omega\ cm)$ | Technique | Stack |
|---|---|---|---|---|
| Metallic AF in a F/N/AF stack, electronic transport through N | | | | |
| $Ir_{20}Mn_{80}$ | 0.7 | 270 | SP ($\Delta$H) | NiFe/Cu/IrMn |
| $Ir_{50}Mn_{50}$ | 0.7 ± 0.2 | 293.3 | SP | NiFe/Cu/FeMn |
| $Ir_{20}Mn_{80}$ | ≤1 (4.2K) | 126 | CPP - GMR | NiFe/Cu/IrMn/Cu/NiFe |
| $Pd_{50}Mn_{50}$ | 1.3 ± 0.1 | 223 | SP | NiFe/Cu/PdMn |
| $Fe_{50}Mn_{50}$ | ≤1 (4.2K) | 87.5 ± 5 | CPP - GMR | NiFe/Cu/FeMn/Cu/NiFe |
| $Fe_{50}Mn_{50}$ | 1.8 ± 0.5 | 167.7 | SP | NiFe/Cu/FeMn |
| $Fe_{50}Mn_{50}$ | 1.9 | 135 | SP ($\Delta$H) | NiFe/Cu/FeMn |
| $Pt_{50}Mn_{50}$ | 0.5 ± 0.1 | 164 | SP | NiFe/Cu/PtMn |
| $Pt_{50}Mn_{50}$ | 2.3 | 119 + 260/$t_{AF}$ (nm) | ST - FMR (HR) | FeCob/Hf/PtMn |
| Metallic AF in a F/AF stack, electronic, and magnonic transport regimes | | | | |
| $Ir_{25}Mn_{75}$ | 0.5 | 250 | ST - FMR | NiFe/IrMn |
| $Fe_{50}Mn_{50}$ | 2 | 166 | ST - FMR (HR) | NiFe/FeMn/Pt |
| $Fe_{50}Mn_{50}$ | <2 electronic | . . . | SP | NiFe/FeMn/W |
| $Fe_{50}Mn_{50}$ | 9 magnonic | . . . | SP | NiFe/FeMn/W |
| Cr | 2.1 | 25-325 | SSE | YIG/Cr |
| Cr | 4.5 (4.2K) | 180 ± 20 | CPP - GMR | Fe/Cr/Fe |
| Cr | 13.3 | 500-1200 | SP | YIG/Cr |
| Mn | 10.7 | 980 | SP | YIG/Mn |

Spin penetration depth and resistivity (ρ) for various antiferromagnetic materials.
Finite-size effects on ρ are reported when available. Unless specified otherwise,
NiFe is close to $Y_3Fe_5O_{12}$. When not specified the investigation temperature was 300 K.
CPP - GMR refer to perpendicular to plane excitation-giant magneroresistance detection,
SP and SP (ΔH) refer to ferromaganetic resonance spin pumping excitation-inverse
spin Hall effect detection when not specified, and ferromagnetic resonance linewidth
detection when (ΔH) is specified, ST - FMR and ST - FMR(HR) refer to spin torque
ferromagnetic resonance excitation induced by spin Hall effect as a result of an ac
current flow-anisotropic magnetoresistance detection when not specified, and second
harmonic response detection of the anomalous Hall effect and/or anisotropic
magnetoresistance when (HR) is specified, and SSE refer to spin Seebeck excitation
induced by a thermal gradient-inverse spin Hall effect detection.

| AF material | Spin penetration depth (nm) | ρ(μΩ cm) | Technique | Stack |
|---|---|---|---|---|
| | | Insulating AF in a F/AF stack, magnonic transport | | |
| NiO | 1.3 | >> | SSE | YIG/NiO/Ta |
| NiO | 2.5 | >> | SSE | YIG/NiO/Pt |
| NiO | 2-5.5 (180-420K) | >> | SSE | YIG/NiO/Pt |
| NiO | 2 | >> | SP | YIG/NiO/Pt |
| NiO | 3.9 | >> | SP | YIG/NiO/Pt |
| NiO | 9.8 | >> | SP | YIG/NiO/Pt |
| NiO | 10 | >> | SP | YIG/NiO/Pt |
| NiO | 50 | >> | ST - FMR | NiFe/NiO/Pt |
| α - $NiFe_2O_4$ | 6.3 | >> | SP | NiFe/α - $NiFe_2O_4$/Pt |
| α - YIG | 3.9 | >> | SP | NiFe/α - YIG/Pt |
| $Cr_2O_3$ | 1.6 | >> | SP | $Cr_2O_3$ |

Other transition metal complexes suitable for use include those disclosed in Table 1 of Demir et al., Coordination Chemistry Reviews 289-290 (2015) 149-176, reproduced below:

| Compounds | $J_1{}^a$ | $J_{L-L}{}^a$ | Compounds | $J_1{}^a$ | $J_{L-L}{}^a$ |
|---|---|---|---|---|---|
| Nitroxide (monodentate) | | | $M(Cl_4SQ)_3$(M = Fe, Cr) | −60(Fe), −400(Cr) | |
| (tempo)Cu(hfac)$_2$ | ≤−225 | | $M(phenSQ)_3$(M = Fe, Cr) | −100(Fe), −350(Cr) | |
| (tempo)$_2$Mn(hfac)$_2{}^b$ | −79$^c$ | | $Fe(F_{ADBP}{}^{ISQ})_3$ | −184(5) | $0^k$ |
| (proxyl)$_2$ Mn(hfac)$_2$ | −105$^c$ | | $M(phenSQ)_2$(py) (M = Ni, Co) | ~0(Ni), −3.6(Co) | |
| (NITPh)$_2$CuCl$_2$ | −7$^d$ | | Ni(phenSQ)$_2$(bpy) | −0.7 | |
| (NITPh)$_2$Cu(hfac)$_2$ | <+5 | | Fe(3,6 − DBSQ)$_3$ | −139 | −235 |
| (NITPh)Cu(hfac)$_2$ | nr$^e$ | | Cu(3,6 − DBSQ)$_2$ | +100 | |
| (NITPh)$_2$Ni(hfac)$_2$ | −200 | | Ni(3,6 − DBBQ) (3,6 − DBSQ)$_2$ | +89.1 | −89.9 |
| (NITPh)$_2$Cu(tfac)$_2$ | <−500$^c$ | | Mn(3,6 − DBSQ)$_2$ (3,6 − DBCat) | nr$^f$ | |
| Nitroxide (bidentate) | | | $[Cr(Cl_4SQ)_2(Cl_4cat)]^-$ | nr$^f$ | |
| (NIT2Py)$_2$MCl$_2$ (M − Ni, Mn) | −100(Ni), −79(Mn) | | Cu(ADBP$^{isq}$)$_2$ | +195$^j$ | −400 |
| (NIT2Py)M(hfac)$_2$ (M = Ni, Mn) | −167(Ni), −65(Mn) | | Fe(ADBP$^{ISQ}$)$_2$ X(X = Cl, Br, I) | nr$^k$(Cl), −145(Br), −100(1) | |
| [(NITImH)$_3$Mn]$^{2+}$ | −53(2) | | $Mn^{III}$(ADBP$^{ISQ}$)$_2$ (ADBP$^{PDI}$) | −300 | $0^l$ |
| [(NITBzlmH)$_3$Mn]$^{2+}$ | −79(5) | | $Mn^{IV}$(ADBP$^{ISQ}$)$_2$ (ADBP$^{PDI}$) | −470 | $0^l$ |
| [(NIT2Py)$_3$M]$^{2+}$ (Ma = Ni, Mn) | −111(Ni), −88(Mn) | | $Mn^{IV}$(rbu$_{ADBP}{}^{ISQ}$)$_2$ (rbu$_{ADBP}{}^{PDI}$) | −292 | |
| [(2PyNO)$_2$M(H$_2$O$_2$)]$^{2+}$ (M = Ni, Cu) | +88(Ni), −95(Cu) | | Cu(MeS$_{ADBP}{}^{ISQ}$Q)$_2$ | −207 | −57 |
| [(phpyO)$_2$Ni(H$_2$O$_2$)]$^{2+}$ (M = Ni, Cu) | +142(Ni), +151(Cu) | | N(tbu$_{PDA}{}^{ISQ}$)$_2$ | nr$^e$, −946$^l$ | |
| [(phpyNO)$_2$Cu(ClO$_4$)$_2$] | +96 | | [Cu(NH(py)$_2$)(3,5 − DBSQ)]$^+$ | +110 | |
| [(phpyNO)$_2$Cu(CF$_3$SO$_3$)$_2$] | −327 | | [Ni(CTH)(3,5 − DBSQ)]$^+$ | nr$^k$, +178$^l$ | |
| Nitroxide (tridentate) | | | [Ni(CTH)(phenSQ)]$^+$ | nr$^k$, +142$^l$ | |
| [(2,6 − NITpy)$_2$Ni]$^{2+}$ (M = Ni, Co, Mn) | −167(Ni), nr$^f$ | −10 | [Cr(tren)(3,6 − DBSQ)]$^{2+}$ | <−350$^h$ | |
| [(2,6 − NITpy)$_2$Cu]$^{2+}$ | −320(eq), +7(ax) | −14 | [Cu(dmtacn)(ADBP$^{ISQ}$)]$^+$ | +195 | |
| [(6bpyNo)$_2$Ni]$^{2+}$ (M = Ni, Cu) | +133(Ni), +140(Cu) | | [Co(Me$_4$cyclam)(phenSQ)]$^+$ | −13 | |

-continued

| Compounds | $J_1{}^a$ | $J_{L\text{-}L}{}^a$ | Compounds | $J_1{}^a$ | $J_{L\text{-}L}{}^a$ |
|---|---|---|---|---|---|
| [(dmpoNo)$_2$Cu]$^{2+}$ | −82 | | [Ni(tren)(ADBP$^{ISQ}$)]$^+$ (M = Ni, Fe) | +200(Ni), nr$^e$(Fe) | |
| [(dmmpoNo)$_2$Cu]$^{2+}$ | −78 | | [Fe(F$_{PDA}{}^{ISQ}$)(F$_{PDA}{}^{PDI}$)] | nr$^h$, −640$^l$ | |
| [(dmpoNo)$_2$Co]$^{2+}$8 Nitroxide (tetradentate) | +64 | | Verdazyl and Thiazyl (pyvd)M(hfac)$_2$ (M = Mn, Ni) | −23(Mn), +120(Ni) | |
| (NITbpy)Cu(ClO$_4$)$_2$ | −168 | | (imvd)M(hfac)$_2$ (M = Mn, Ni) | −31(Mn), +97(Ni) | |
| [(NITbpy)Ni(H$_2$O)$_2$]$^{2+}$ | +39.6($J_{Ni-rad}$) | | (pyDTDA)Mn(hfac)$_2$ (M = Mn, Fe, Co, Ni, Cu) | nr$^m$(Mn), −41.9(Fe), Nr$^m$(Cu), +91.7(Ni), +41.1(Co) | |
| [(NITbpy)Ni(H$_2$O)(ClO$_4$)]$^+$ | +27.8($J_{Ni-rad}$) | | [(bipyvd)$_2$Mn]$^{2+}$ (M = Mn, Ni, Cu) | −46.5(Mn), +120(Ni), −2.3 (Cu) | |
| [(NITbpy)Mn(H$_2$O)(ClO$_4$)]$^+$ | −65.3 | | [ (dp vd)$_2$Ni]$^{2+}$(cbvd)$_2$ | >+110 | >+50 |
| [(NITbpy)Co(H$_2$O)(ClO$_4$)]$^+$ | + 0.4($J_{Ni-rad}$) | | Ni(H$_2$O)$_2$(M = Ni, Co) | +188(Ni), +68(Co) | −42 |
| Benzosemiquinonoid Fe(3,5 − DBSQ)$_3$ | −190$^h$ | | Carbene [Co(EBAMP)(NCO)$_2$(C1py)] | −35.6 | |

Summary of magnetic exchange interactions in selected structurally characterized mononuclear transition metal complexes that contain radical ligands.

$^a$J values were estimated based on the general Hamiltonian H = $2J_1S_MS_{L1} − 2J_2S_MS_{L2} − 2J_{L-L}S_{L1}S_{L2}$ and are shown in units of cm$^{-1}$.

$^b$for (tempo)$_2$M(hfac)$_2$(M = Ni, Co), the magnetic interaction was shown to be antiferromagnetic, but no values of J were reported.

$^c$No Hamiltonian was reported.

$^d$a chain model based on Bonner-Fisher theory was used due to the presence of intermolecular interactions.

$^e$Diamagnetic at room temperature.

$^f$antiferromagnetic.

$^g$single-molecule magnet.

$^h$S = 1 at room temperature.

$^i$S = ½ at room temperature.

$^j$This value was fixed to fit the susceptibility data.

$^k$S = ³⁄₂ at room temperature.

$^l$Theoretical value obtained from DFT calculation $^m$Magnetic behavior of isolated metal ion due to intermolecular ligand dimerization;

nr = not reported.

An alternative aqueous processing method (APM) using copper acetate at about 2% on an end-of-life (EOL) ground tire rubber (mass-on-mass) results in a metathesis chemical reaction at a methyl carbocation-sulfuric bridge site, whereby the sulfuric bridge is liberated to a dangling condition which may then be re-connected at a later time by using a peroxide catalyst. The APM is carried out in a reactor using water at 300% by weight of the EOL ground tire rubber. The aqueous mixture can have a concentration of antiferromagnetic material of from 5 to 8% by weight, e.g., about 6.5% by weight, and the mixture with the ground tire rubber can be dried to reduce moisture content.

The current antiferromagnetic (AFM) based process liberates the linked elastomer strands by cleaving the sulfur bond photonically. The cleaved bond may be re-connected as an S—S bond by simply raising the temperature of the resulting smaller elastomer-containing particles, first pressed into a tight sheet or pressure-molded compound, to above the melting point of the sulfur.

The final, re-crosslinked physical properties of the antiferromagnetic material are ⅓ to ½ better than that of the aqueous processing method material.

Comparing the APM product versus AFM method product for use in new tire production, the economics favor the AFM method product, as the extra OMC plus drying process costs of the APM method adds about $0.09/lb to the production cost while the AFM adds about $0.04/lb to production cost. A further advantage for AFM method product versus APM product is that unlike in the AFM method, the bound water in the OMC used in the APM process is difficult to remove, leading to blistering in the curing mold on tires.

Early testing of AFM samples show that higher loadings of the AFM derived material may be employed in tire sidewalls, as compared to the APM product, as the AFM derived material re-constitutes at an entangled morphology within virgin materials to eliminate in-service, stress-induced crystallinity zones—zones which weaken the tire and reduce tire life.

Particulate Matter

The OMC or AFM can be provided in simple admixture with the GTR and subjected to forces as described herein in a suitable reactor. A fixed wiping surface can facilitate distribution of the OMC throughout the GTR in the mixing-grinding process. This surface can be provided in the form of solid particulate matter having properties of porosity or surface texture combined with structural rigidity and resistance to a force applied to the surface of the particle under conditions of the mixing-grinding process, wherein the OMC or AFM is supported on the surface. The solid particulate matter can also provide a non-compressible medium in the mixture, which aids in strain distortion of the OMC molecular structure in the reactor, furthering the superposition efficiency of the OMC in the AFM process. Suitable solid particulate matter can include, e.g., minerals, metal alloys (e.g., nickel-chrome, stainless steel, 602A alloy), metals or metal oxides (e.g., iron, nickel, copper, aluminum, zinc, lead, tin, tungsten, titanium, molybdenum, nickel, tantalum, or oxides thereof), oxides, carbides, nitrides, borides, silicates, graphite, ceramics, refractories, sintered metals or other materials, and the like. These can include the oxides of silicon, aluminum, magnesium, calcium, and zirconium. Nonporous materials can be employed, but high surface area and/or porous solid particulate matter can offer advantages as supports, e.g., in constraining the OMC or AFM. Such materials can have a surface area of approximately 50 m$^2$/g to 1000 m$^2$/g (e.g., 100-500 m$^2$/g) but higher and lower surface areas can also be employed. The support particles can have an average diameter of from about 10 nm or less to about 1 mm or more, e.g., 100, 500, or 1000 nm to 0.01 mm, 0.1 mm, or 1 mm.

In some embodiments, the support is from 30 mesh down to 500 mesh, e.g., 40, 50, 60, 70, 80, or 90 mesh down to 100, 150, 200, 250, 300, 350, 400, 450, or 500 mesh. Supports that are typically employed as heterogeneous catalyst supports for chemical processing may advantageously be employed, e.g., alumina, silica, titanium oxide, zeolites, etc. However, silica offers advantages in that it is a relatively lower-cost material with suitable properties than more exotic supports.

While an OMC or AFM supported on a solid is typically employed, in certain embodiments the OMC or AFM may possess properties or be able to be formed into a suitable solid without the need for a support.

An example of a suitable solid particulate material is silica, e.g., in the form of amorphous precipitated silica powder (APSP). An exemplary method involves dry mixing-grinding the OMC with an APSP, e.g., PPG's, HI-Sil 134G micro granules, at a ratio in the range of 1:10 to 1:50 (OMC:134G); then adding to 30 mesh (600 micron) ground tire rubber (GTR) such that the OMC is kept in the range of 1-2% of the initial GTR weight when the dry compound OMC/APSP is added to the GTR before entering the continuous reactor vessel. Such a supported OMC is sometimes referred to herein as a doped ceramic frit (DCF). A DCF prepared using the "N2, BET-5 Method" will have a surface area in the range of 140-190 m²/g. For a DCF within this surface area range, typically approximately 1-2 parts by weight DCF to 100 parts by weight GTR is employed; however, higher or lower amounts of DCF to GTR can also be employed.

This mixing-grinding of the OMC into micro-pores of APSP, which has a surface area of approximately 180 m²/g, provides a fixed wiping surface for distributing the OMC throughout the GTR. It also provides a substantial increase in a non-compressible medium, which aids in strain distortion of the OMC molecular structure in the reactor, furthering the superposition efficiency of the OMC in the AFM process.

End-use applications of such an AFM derived tire particulate (DTP) (referred to herein as AFM-DTP), such as new tires and shoe soles, which traditionally use a silica powder in formulations to improve strength and cut resistance, benefits from use of the AFM-DPT to partially or wholly replace such filler(s). Added performance is also obtained from the elastomer component of the AFM-DTP.

SUMMARY

Rubber is an essential material to building and maintaining the worldwide civil and transportation infrastructure. The properties of natural rubber have not been duplicated with synthetic rubber. The EU has designated natural rubber as one of the seventeen critical material supplies not under its control, which if its supply fell into shortage, would disrupt its circular economy. A war involving the Asian Rim or a natural disaster could scuttle the flow of natural rubber to the rest of the world. As provided herein, we now have a provable solution to possible crisis.

Early test data comparing the SMP (Strain Matrix Process) elastomer, CMP (Collision Matrix Process) elastomer, and virgin rubber compounds show the SMP elastomer to be unequivocally superior to both, making it the preferred choice under any market-supply contingencies. The following includes additional basic information supporting the SMP innovation.

1. Quantum Photon Emission Genetics (Q-PEG)

Ceramic compounds of copper and oxygen, known as cuprates, which exhibited "high" temperature superconducting were discovered in 1986. Within the next two years it was also discovered that these cuprates, and other metallic oxide crystalline structures, could achieve room temperature superconducting properties when placed under strain and notably, upon the release of that strain, emit ionizing radiation in spectral bandwidth from near visible through UV.

Since then, during the last thirty years, intense investigation has been underway to harness these phenomena, especially as it relates to scalable quantum information technologies. Better understanding of the mechanisms for pressure-induced transitions between ferromagnetic and antiferromagnetic phases have centered around the two orbital p-d lattice model. Recent published studies have expanded with much greater detail upon this emergent understanding as it relates to cuprates.

All cuprates have the same structural building blocks, namely, layered planes of copper peroxide (CuO2), or analogs thereof. These layered planes have an out-of-plane oxygen ion referred to in this discussion as being an apical oxygen. The oxygen ion is positioned at the peripheral "above" each copper atom in the CuO2 plane and may be compared to a helium filled balloon attached to the cuprate structure. Cuprate compounds with such a planar element will be otherwise defined by what other elements are integrated within it molecular, crystal lattice structure and attached to the apical oxygen thereby becoming an apical cation e.g., lanthanum, bismuth, copper, etc.

Research has demonstrated that a fundamental key to determining the "ease" with which the lattice structure can dimensionally move between a tension compression cycle is regulated by the bond between the apical cation and apical oxygen (anion). The stronger this bond the greater the pressure required to move the lattice to a superposition between adjoining, otherwise repelling orbitals. Upon achieving the mechanical distortion for a particular lattice compound a superconducting highway is established with antiferromagnetic characteristics. As pressure drops (strain relief), with the lattice returning to its original geometry, a photon burst occurs.

2. Ceramic Structure

Crystal lattice spacing is targeted to be about 0.21 nm, with a range of between 0.09 nm and 0.45 nm. It presently is composed of a Si—CuO frit, or derivatives thereof. The ceramic frit is compounded through a thermally controlled, twin shaft, co-rotating mixer/extruder reactor into ground tire rubber at between 1-10% by weight as a 15-100 nm aggregate, with the ceramic frit aggregate experiencing some size attrition during the reaction cycle.

3. Strain Induced Photon Spectrum

During the compression cycles of the frit, atomic distances are reduced or modified. This strain induced, geometric modification is restored after the compressing force is removed. Upon compression, superposition of valence electrons, in particular the 2p orbitals of the elements in the lattice, exchange or hop to the adjoining element of the lattice structure. This superposition causes the magnetic fields within the crystal to become antiferromagnetic whereby the crystal lattice offers no resistance to the flow of electrons, i.e., it becomes a superconductor. This event can occur at high temperatures up to 90° C. and under pressures of as little as 20 MPa.

The Si—CuO, responding to anisotropic biaxial stress, upon relaxation, responds with transition energy in the form of bursts of photons. The spectral wavelengths emitted will fall between 200 nm and 900 nm. Conditions dictating the transition energy bandwidth(s) are intentionally size-confined nano structures, crystal imperfections, rate of strain, degree of strain, compression cycle timing and temperature.

4. Carbon Particle Surface Modification & Re-Emitted Photon Spectrum Modulation

Surface modification has been demonstrated to be an effective method to prepare the physical and chemical properties of the tire carbon reinforcement.

UV irradiation of the embedded carbon filler modifies the carbon surface chemistry with photoluminescence around 280 nm, 340 nm and 435 nm as these spectra match the absorption wavelength of the carbon-oxygen binding energies. Morphology studies reveal that: C=C, C—O, and C=O bonds calculated to be 66%, 26%, and 8% respectively before irradiation and subsequent to irradiation to be 80%, 14%, and 6% respectively.

The reduced oxidation structure activates and increases the original carbon filler's reinforcement of and within the interpenetrating (IPN) elastomer by reducing the embedded atomic distance between the carbon particles and the long, organic chains.

Photons generated from the crystal lattice de-compression, upon colliding with carbon particles, may be completely attenuated (absorbed), pass through or be scattered as longer wavelengths. Time of flight of non-absorbed, scattered wavelengths in the 200-450 nm range emanating from collision within the carbon lattice has been characterized with bulk bandwidths in the 500-1,000 nm range. This becomes an additional source of the 750-770 nm wavelength which is resonant with the C—S bond cleavage necessary to de-link the sulfur bridge associated with previous vulcanization of the EOL tire moiety.

5. C—S Bond Disruption & Bound Elastomer Loop Liberation

Further, radiation spectra of about 760 nm cleave C—S bonds, in particular at the elastomer's methyl and primary carbocation and the sulfur crosslink bridge, as previously discussed.

6. Overcoming Scrap Tire Source "Variability Concern"

EOL tire carcass incorporates a variety of chemical compounds depending upon tread, sidewall, truck versus auto applications, as well as the numerous ingredient options available to tire manufacturers around the world. This reality might lead to variable performance of the re-use of tire scrap in new tire construction. This variable performance is known as the "Variability Concern".

The dissociation of these variations to a sub-micron, granular re-synthesis mastered with this process provides a substantial dilution of the concern. However, this diminution does not provide an absolute certainty of successful, uniform performance at ameliorating the challenge.

Three additional morphologically measurable achievements raise the post processing performance of the permutated EOL tire rubber to a level that the Variability Concern has been overcome. Those achievement are: 1) the liberation and subsequent full functionalization of the ca 20% of the otherwise inaccessible, confined elastomer loops associated with all new tire construction, 2) the aforementioned C=C bond enrichment and improved elastomer embedment and 3) the subsequent stoichiometric integration of the ceramic frit into the liberated elastomer loop as a compatible reinforcement.

Certification of superior performance of every batch of this permutation, tested pursuant to industry standards, established the standard of excellence for this new material.

24

EXAMPLES

Elastomer samples were obtained or prepared, and physical properties tested.

SBR 1502 Baseline

Styrene-Butadiene Rubber (SBR) (SBR 1502 Elastomer from Lion Elastomers LLC, Port Neches, TX), served as a baseline material, and as a blend component, referred to below as "SBR 1502 Baseline".

PTR Material

An OMC (copper acetate) was subjected to dry mixing-grinding with 30 mesh (600 micron) ground tire rubber (GTR) in a ratio by weight of 2:100 (the weight of OMC was 2% of the weight of the GTR when the dry compound OMC was added to the GTR before it entered the reactor). A twin screw, counterrotating, extruder barrel reactor was employed. The resulting material is referred to herein as "PTR Material" or "Raw PTR Material". The methodology employed was based on that disclosed in U.S. Pat. Nos. 10,662,320, 10,626,275, and 10,800,906, the contents of which are hereby incorporated by reference in their entireties.

Stage 2 PTR Material

An OMC (copper acetate) was deposited on an APSP (HI-Sil™ 134G micro granules, PPG Industries, Inc., Monroeville, PA) at a weight ratio of 1:10 (OMC:134G) by sputter coating to a thickness of 5-10 nm to yield OMC/APSP composite. 30 mesh (600 micron) ground tire rubber (GTR) was mixed with the OMC/APSP composite by metering/mixing the composite into an un-modified stream of ground tire rubber as a homogenous, dry maw (weight ratio of OMC to GTR of 2:100). This homogeneous, dry maw was then forced, by a stuffing box, into a twin screw, counterrotating, extruder barrel where it was subjected to a pulsed, high compression, electro-mechanical and acoustic environment. The resulting material is referred to herein as "Stage 2 PTR Material".

SBR 1502 Baseline—PTR Blend

Figure 4:
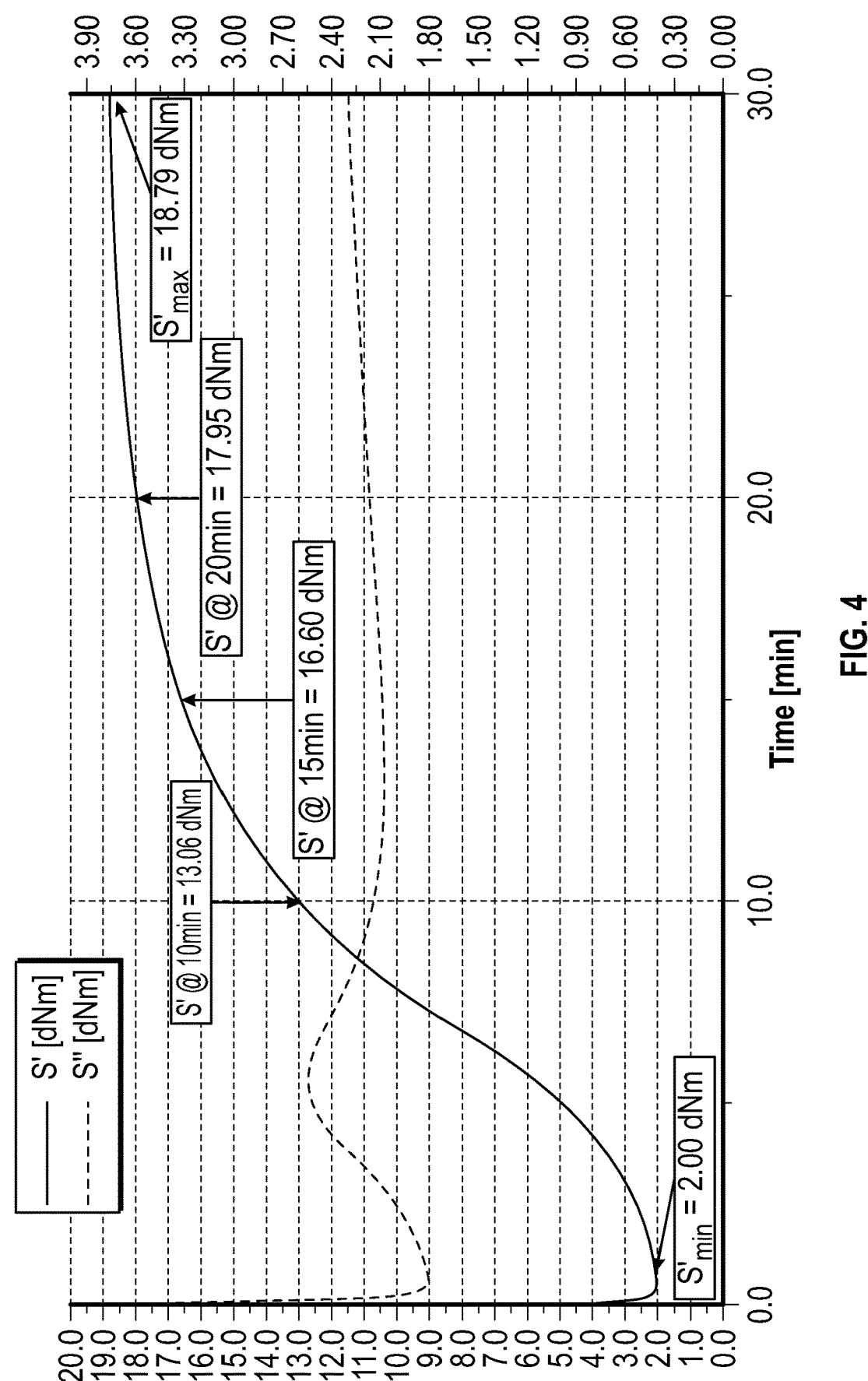
FIG. 4 is a graph showing Young's Modulus data for a 1:1 (by weight) mixture of a crosslinked Styrene-Butadiene Rubber (SBR) (SBR 1502 Elastomer from Lion Elastomers LLC, Port Neches, TX) and a PTR rubber.

SBR 1502 Baseline was mixed with PTR Material at a weight ratio of 50:50 in a twin screw, counterrotating, extruder barrel where it was crosslinked to yield a SBR 1502 Baseline-PTR Blend. The physical properties of the resulting blend were tested. Test Results after isothermal curing at 160° C. are provided in Table 3. FIG. 4 is a graph showing Young's Modulus data for the SBR 1502 Baseline-PTR Blend.

TABLE 3

| SBR1502 Baseline-PTR 50:50 wt | | |
|---|---|---|
| Test 1 | | |
| 1. Isotherm | | |
| Strain | 1.00 | [GRAD] |
| Frequency | 1.70 | [Hz] |
| Test Temperature | 160.00 | [° C.] |
| Offset | 0.00 | [GRAD] |
| Closing Pressure | 4.00 | [bar] |
| Range | 0-200 | [dNm] |
| Time/Step Isotherm | 30.00 | [min] |
| S' max [dNm] | | 18.79 |
| S' min [dNm] | | 2.00 |
| S' @ 1.0' test time [dNm] | | 2.09 |
| S' @ 10.0' test time [dNm] | | 13.06 |
| S' @ 20.0' test time [dNm] | | 17.95 |
| S' @ 50% test time [dNm] | | 16.60 |

TABLE 3-continued

| SBR1502 Baseline-PTR 50:50 wt | | |
|---|---|---|
| TC 10 [min] | | 3.80 |
| TC 20 [min] | | 5.22 |
| TC 50 [min] | | 8.08 |
| TC 90 [min] | | 16.40 |
| Scorch time (ts 1) [min] | | 3.02 |
| Scorch time (ts 2) [min] | | 4.12 |
| Peak rate (s'/min) [dNm/min] | | 1.94 |

SBR 1502 Baseline—Raw PTR Blend

Figure 5:
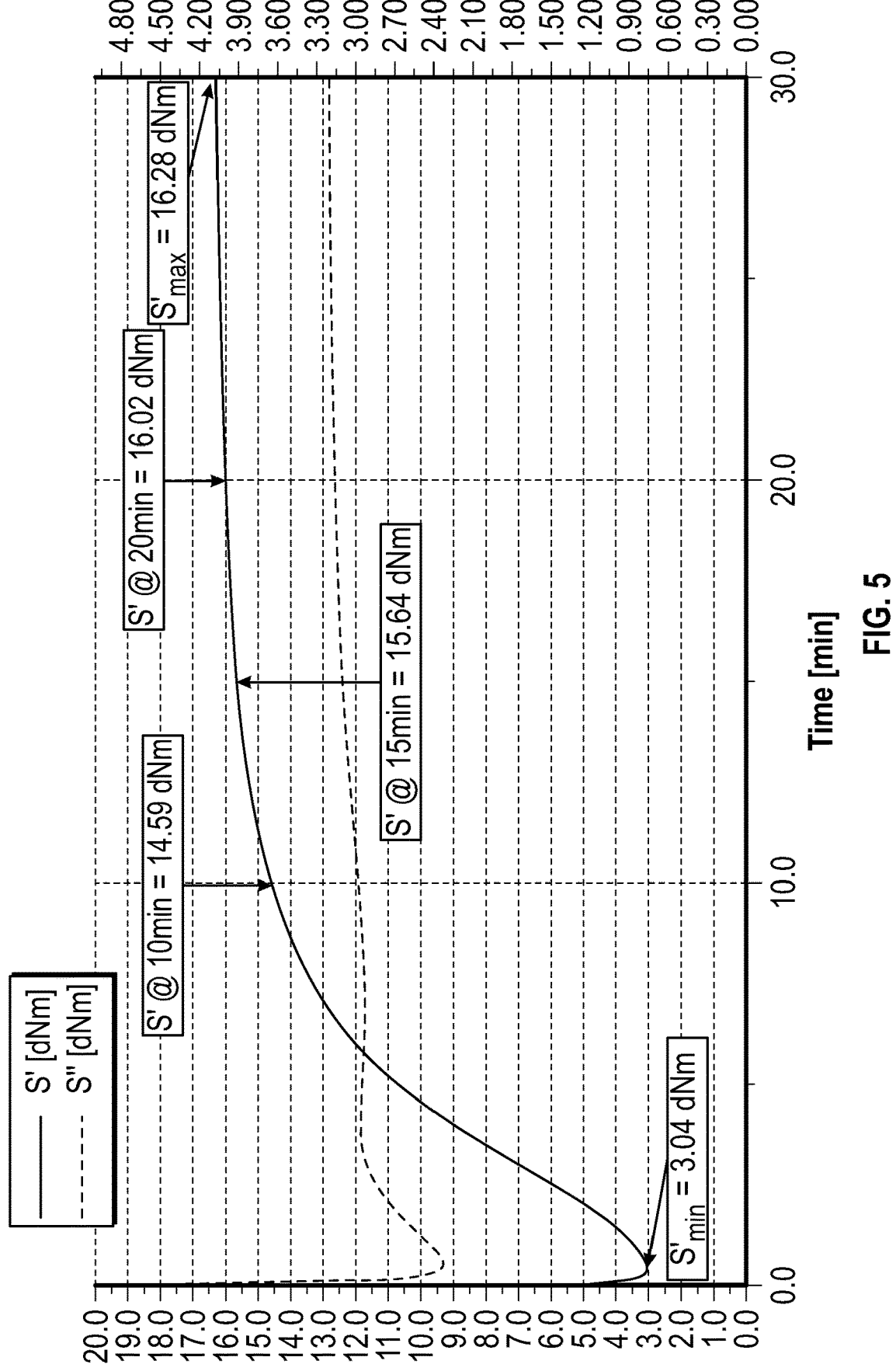
FIG. 5 is a graph showing Young's Modulus data for a 2:1 (by weight) mixture of a conventional crosslinked Styrene-Butadiene Rubber (SBR) (SBR 1502 Elastomer from Lion Elastomers LLC, Port Neches, TX) and a PTR rubber.

SBR 1502 Baseline was mixed with Raw PTR Material at a weight ratio of 2:1 in a twin screw, counterrotating, extruder barrel where it was crosslinked to yield a SBR 1502 Baseline-Raw PTR Blend. The physical properties of the resulting blend were tested. Test Results after isothermal curing at 160° C. are provided in Table 4. FIG. 5 is a graph showing Young's Modulus data for the SBR 1502 Baseline-Raw PTR Blend.

TABLE 4

| SBR1502 Baseline-Raw PTR (2:1) | | |
|---|---|---|
| Test 2 | | |
| 1. Isotherm | | |
| Strain | 1.00 | [GRAD] |
| Frequency | 1.70 | [Hz] |
| Test Temperature | 160.00 | [° C.] |
| Offset | 0.00 | [GRAD] |
| Closing Pressure | 4.00 | [bar] |
| Range | 0-200 | [dNm] |
| Time/Step | 30.00 | [min] |
| Isotherm | | |
| S' max [dNm] | | 16.28 |
| S' min [dNm] | | 3.04 |
| S' @ 1.0' test time [dNm] | | 3.41 |
| S' @ 10.0' test time [dNm] | | 14.59 |
| S' @ 20.0' test time [dNm] | | 16.02 |
| S' @ 50% test time [dNm] | | 15.64 |
| TC 10 [min] | | 1.68 |
| TC 20 [min] | | 2.36 |
| TC 50 [min] | | 4.34 |
| TC 90 [min] | | 11.2 |
| Scorch time (ts 1) [min] | | 1.49 |
| Scorch time (ts 2) [min] | | 2.04 |
| Peak rate (s'/min) [dNm/min] | | 2.2 |

SBR 1502 Baseline—Stage 2 PTR Blend

Figure 6:
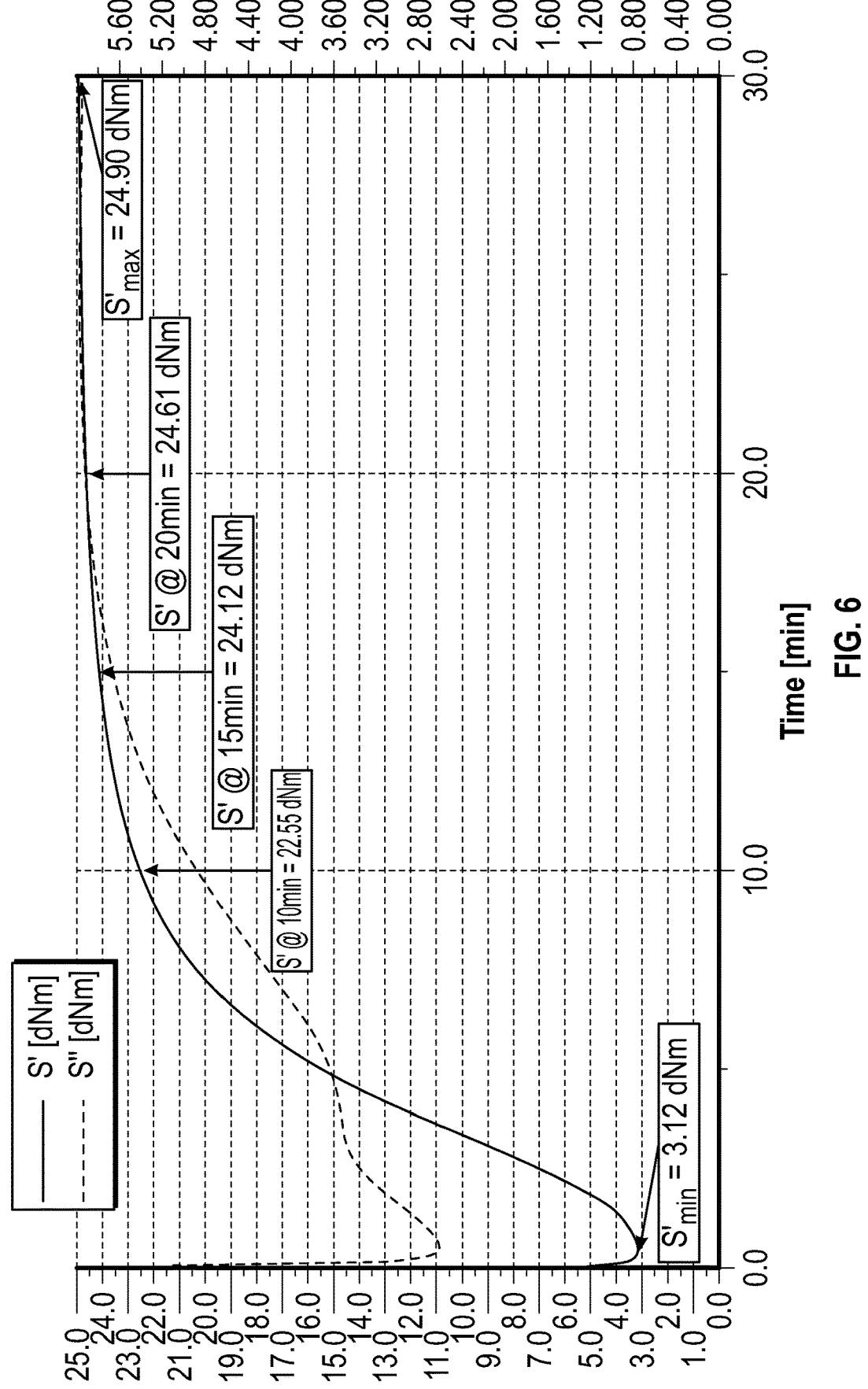
FIG. 6 is a graph showing Young's Modulus data for 2:1 (by weight) mixture of a conventional crosslinked Styrene-Butadiene Rubber (SBR) (SBR 1502 Elastomer from Lion Elastomers LLC, Port Neches, TX) and an AFM-DTP rubber.

SBR 1502 Baseline was mixed with Stage 2 PTR Material at a weight ratio of 2:1 in a twin screw, counterrotating, extruder barrel where it was crosslinked to yield a SBR 1502 Baseline-Stage 2 PTR Blend. The physical properties of the resulting blend were tested. Test Results after isothermal curing at 160° C. are provided in Table 5. FIG. 6 is a graph showing Young's Modulus data for the SBR 1502 Baseline-Stage 2 PTR Blend.

TABLE 5

| SBR1502 Baseline-Stage2PTR (2:1) | | |
|---|---|---|
| Test 3 | | |
| 1. Isotherm | | |
| Strain | 1.00 | [GRAD] |
| Frequency | 1.70 | [Hz] |
| Test Temperature | 160.00 | [° C.] |
| Offset | 0.00 | [GRAD] |

TABLE 5-continued

| SBR1502 Baseline-Stage2PTR (2:1) | | |
|---|---|---|
| Closing Pressure | 4.01 | [bar] |
| Range | 0-200 | [dNm] |
| Time/Step | 30.00 | [min] |
| Isotherm | | |
| S' max [dNm] | | 24.90 |
| S' min [dNm] | | 3.12 |
| S' @ 1.0' test time [dNm] | | 3.49 |
| S' @ 10.0' test time [dNm] | | 22.55 |
| S' @ 20.0' test time [dNm] | | 24.61 |
| S' @ 50% test time [dNm] | | 24.12 |
| TC 10 [min] | | 1.97 |
| TC 20 [min] | | 2.63 |
| TC 50 [min] | | 4.47 |
| TC 90 [min] | | 10.29 |
| Scorch time (ts 1) [min] | | 1.45 |
| Scorch time (ts 2) [min] | | 1.90 |
| Peak rate (s'/min) [dNm/min] | | 3.76 |

Figure 7:
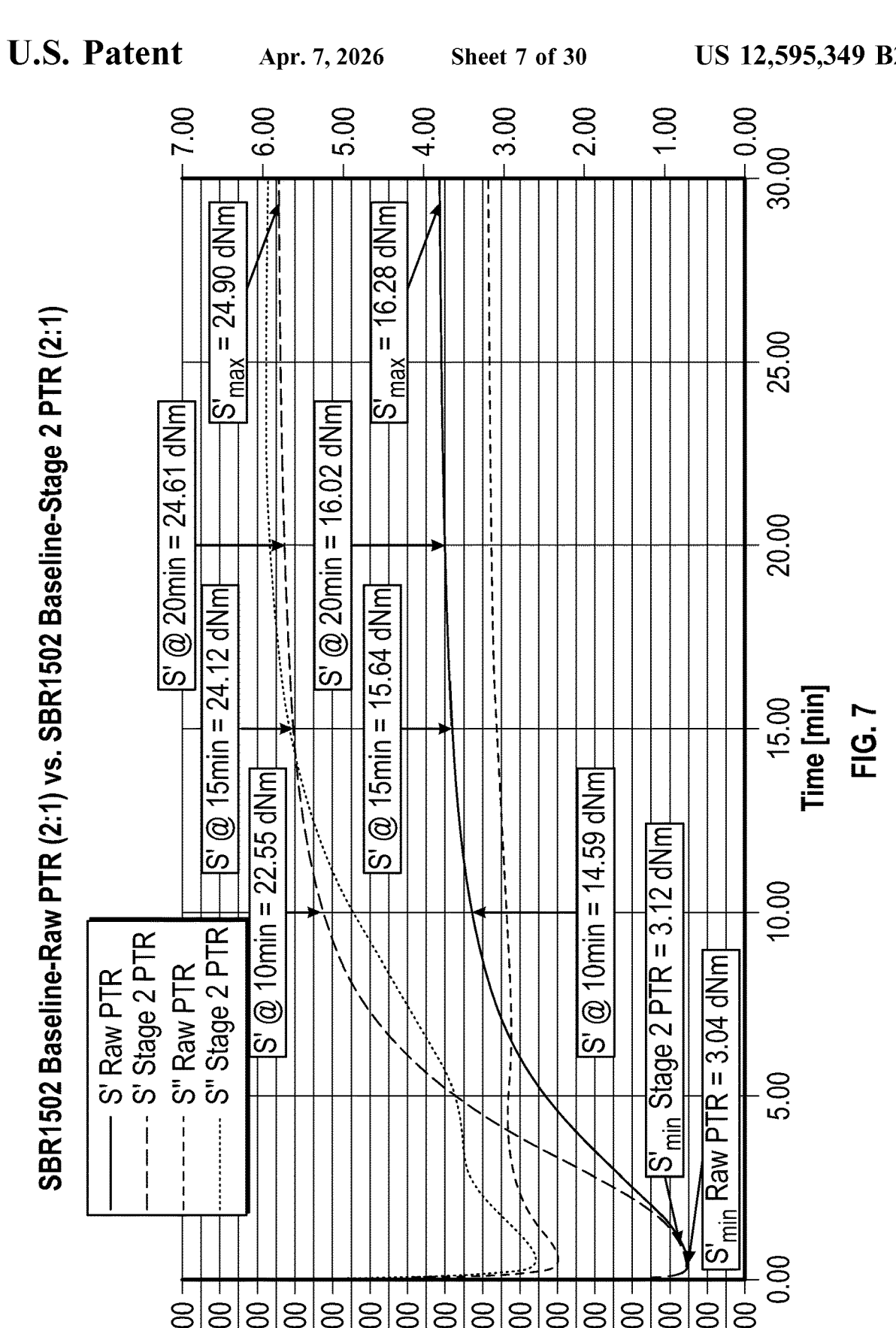
FIG. 7 is a graph comparing Young's Modulus data for the elastomers of FIG. 5 and FIG. 6.

FIG. 7 is a graph comparing Young's Modulus data for the elastomers of FIG. 5 and FIG. 6. The data demonstrate superior performance for the SBR 1502 Baseline-Stage 2 PTR Blend when compared to the SBR 1502 Baseline-Raw PTR Blend.

SBR 1502 Baseline

Figure 8:
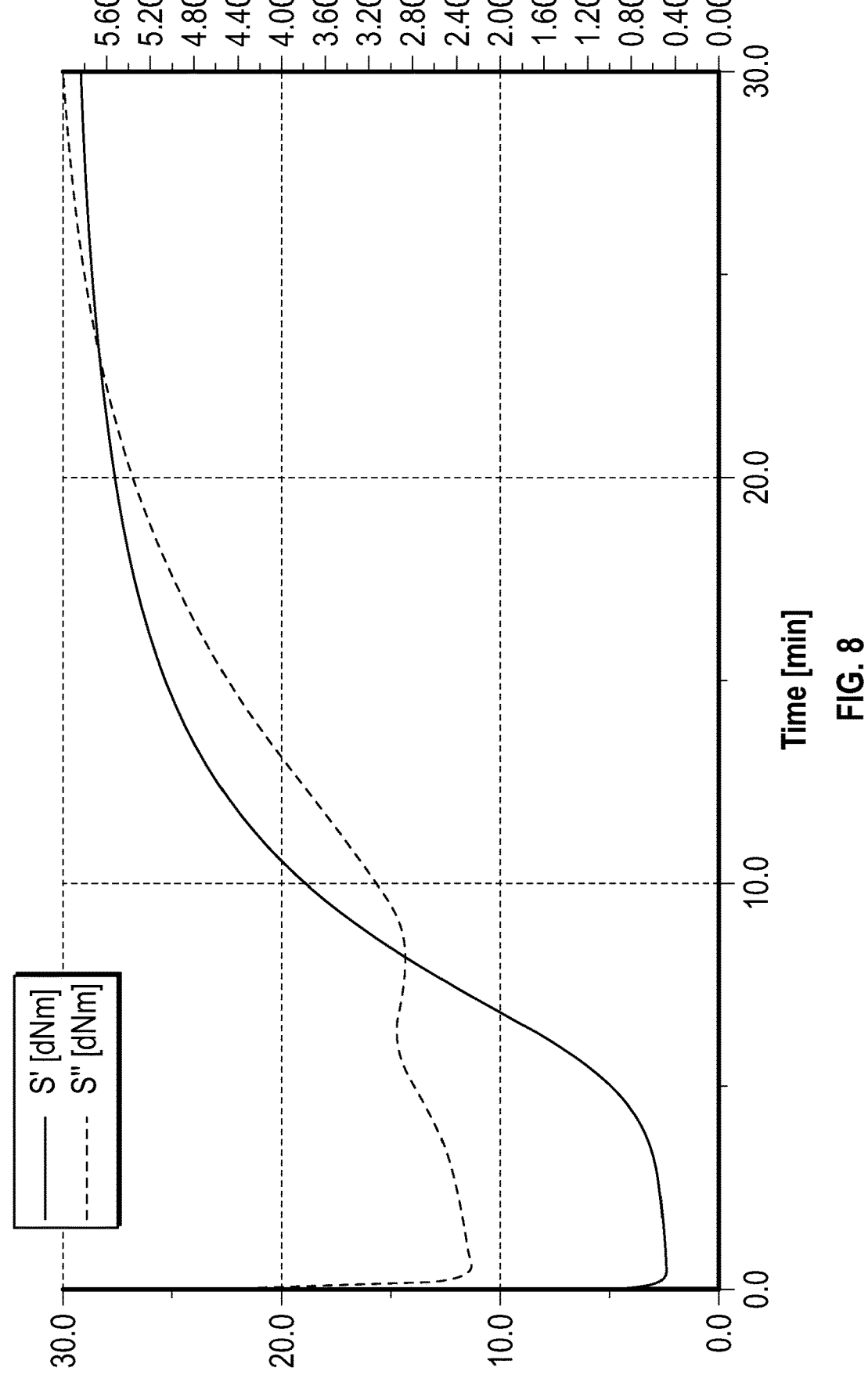
FIG. 8 is a graph showing Young's Modulus data for a crosslinked Styrene-Butadiene Rubber (SBR) (SBR 1502 Elastomer from Lion Elastomers LLC, Port Neches, TX).

The physical properties of SBR 1502 Baseline were tested. Test Results after isothermal curing at 160° C. are provided in Table 6. FIG. 8 is a graph showing Young's Modulus data for the SBR 1502 Baseline.

TABLE 6

| SBR-1502 (Lion) Baseline | | |
|---|---|---|
| Test 4 | | |
| 1. Isotherm | | |
| Strain | 1.00 | [GRAD] |
| Frequency | 1.70 | [Hz] |
| Test Temperature | 160.00 | [° C.] |
| Offset | 0.00 | [GRAD] |
| Closing Pressure | 4.02 | [bar] |
| Range | 0-200 | [dNm] |
| Time/Step | 30.00 | [min] |
| Isotherm | | |
| S' max [dNm] | | 29.11 |
| S' min [dNm] | | 2.34 |
| S' @ 1.0' test time [dNm] | | 2.42 |
| S' @ 10.0' test time [dNm] | | 18.95 |
| S' @ 20.0' test time [dNm] | | 27.59 |
| S' @ 50% test time [dNm] | | 25.26 |
| TC 10 [min] | | 5.04 |
| TC 20 [min] | | 6.09 |
| TC 50 [min] | | 8.66 |
| TC 90 [min] | | 16.95 |
| Scorch time (ts 1) [min] | | 3.83 |
| Scorch time (ts 2) [min] | | 4.67 |
| Peak rate (s'/min) [dNm/min] | | 3.32 |

SBR 1502 Baseline—PTR Blend

Figure 9:
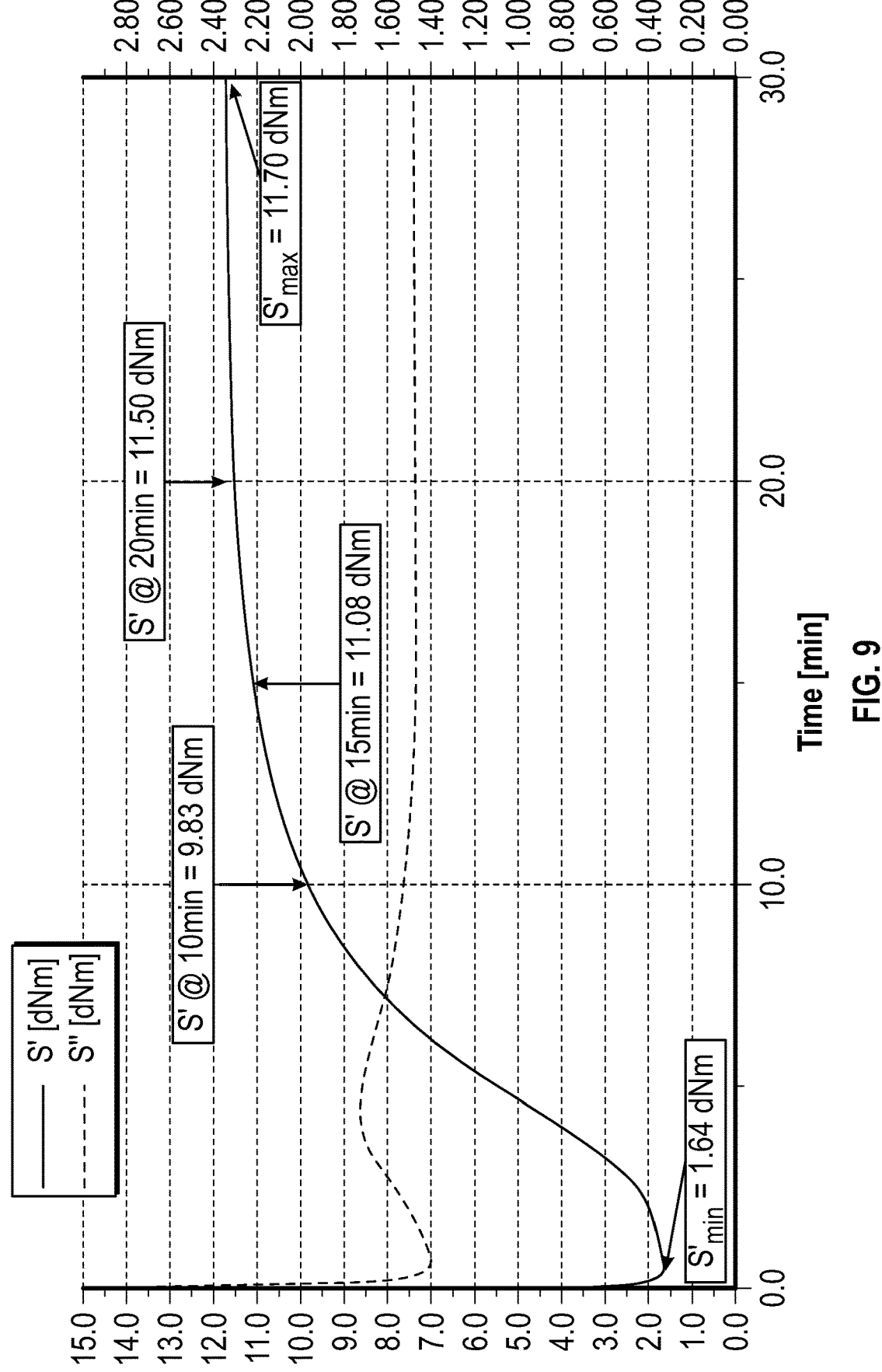
FIG. 9 is a graph showing Young's Modulus data for a 1:1 (by weight) mixture of a crosslinked Styrene-Butadiene Rubber (SBR) (SBR 1502 Elastomer from Lion Elastomers LLC, Port Neches, TX) and a PTR rubber.

SBR 1502 Baseline was mixed with PTR Material at a weight ratio of 50:50 in a twin screw, counterrotating, extruder barrel, where it was subjected to crosslinking to yield a SBR 1052-PTR Blend. The physical properties of the resulting blend were tested. Test Results after isothermal curing at 160° C. are provided in Table 7. FIG. 9 is a graph showing Young's Modulus data for the SBR 1502 Baseline-PTR Blend.

TABLE 7

| SBR1502(Lion)-PTR | | |
|---|---|---|
| Test 5 | | |
| 1. Isotherm | | |
| Strain | 1.00 | [GRAD] |
| Frequency | 1.70 | [Hz] |
| Test Temperature | 160.00 | [° C.] |
| Offset | 0.00 | [GRAD] |
| Closing Pressure | 4.01 | [bar] |
| Range | 0-200 | [dNm] |
| Time/Step Isotherm | 30.00 | [min] |
| S' max [dNm] | | 11.70 |
| S' min [dNm] | | 1.64 |
| S' @ 1.0' test time [dNm] | | 1.72 |
| S' @ 10.0' test time [dNm] | | 9.83 |
| S' @ 20.0' test time [dNm] | | 11.50 |
| S' @ 50% test time [dNm] | | 11.08 |
| TC 10 [min] | | 2.94 |
| TC 20 [min] | | 3.76 |
| TC 50 [min] | | 5.90 |
| TC 90 [min] | | 12.77 |
| Scorch time (ts 1) [min] | | 2.95 |
| Scorch time (ts 2) [min] | | 3.75 |
| Peak rate (s'/min) [dNm/min] | | 1.54 |

SBR 1502 Baseline—Stage 2 PTR Blend

Figure 10:
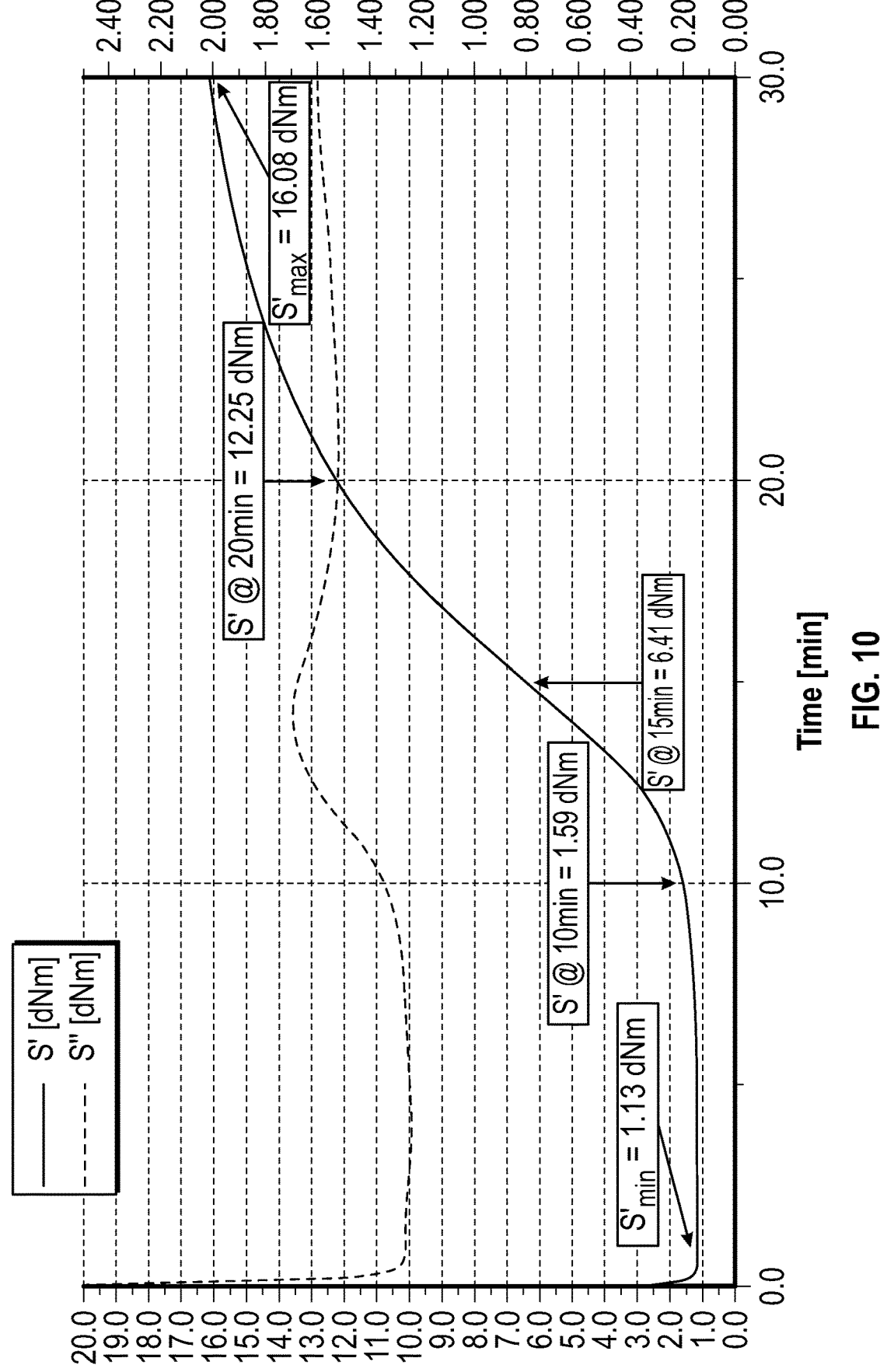
FIG. 10 is a graph showing Young's Modulus data for a conventional crosslinked Styrene-Butadiene Rubber (SBR) (SBR 1502 Elastomer from Lion Elastomers LLC, Port Neches, TX) utilizing a silica supported OMC.
Figure 11:
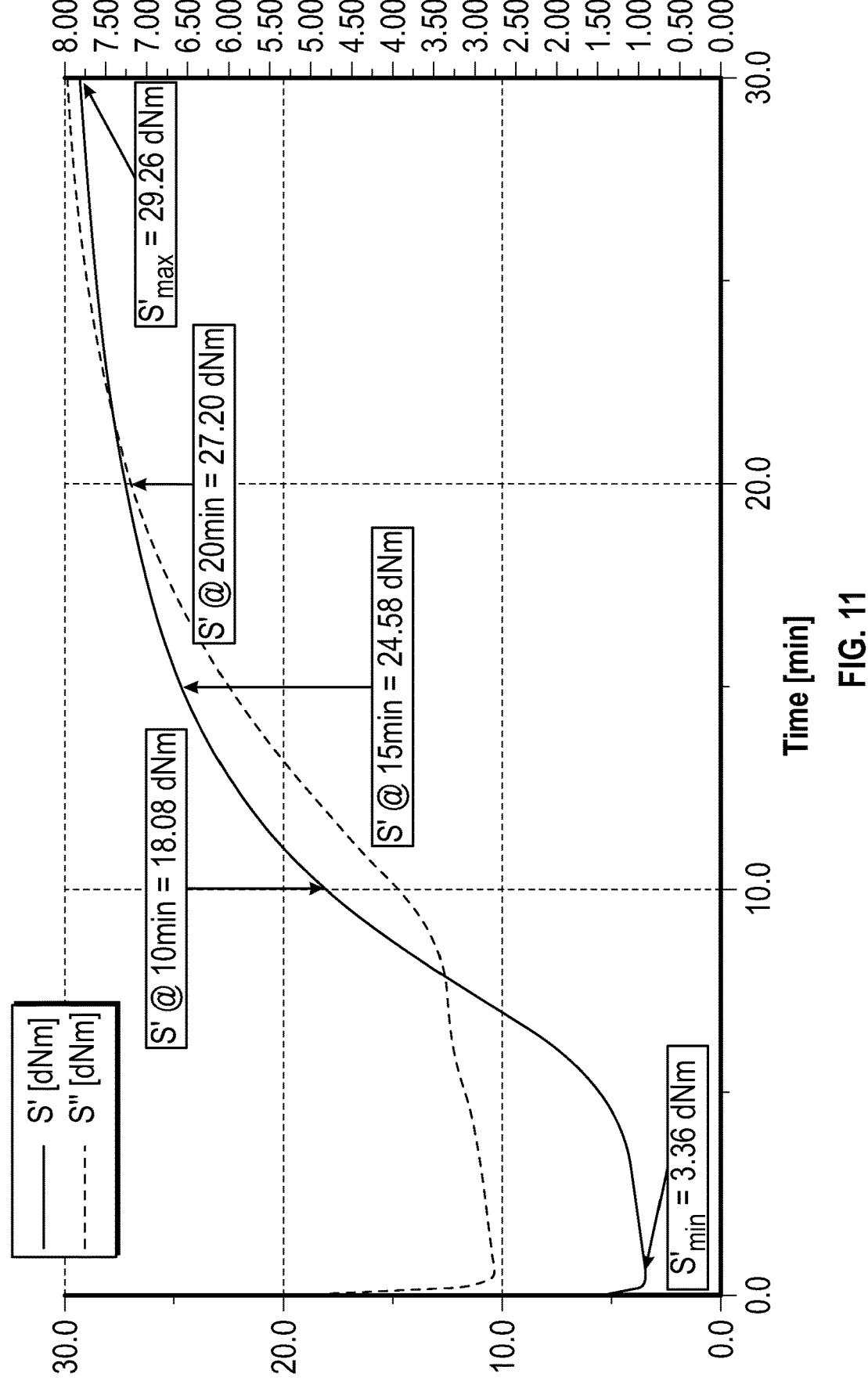
FIG. 11 is a graph showing Young's Modulus data for SBR-1502 (Lion) Baseline.
Figure 12:
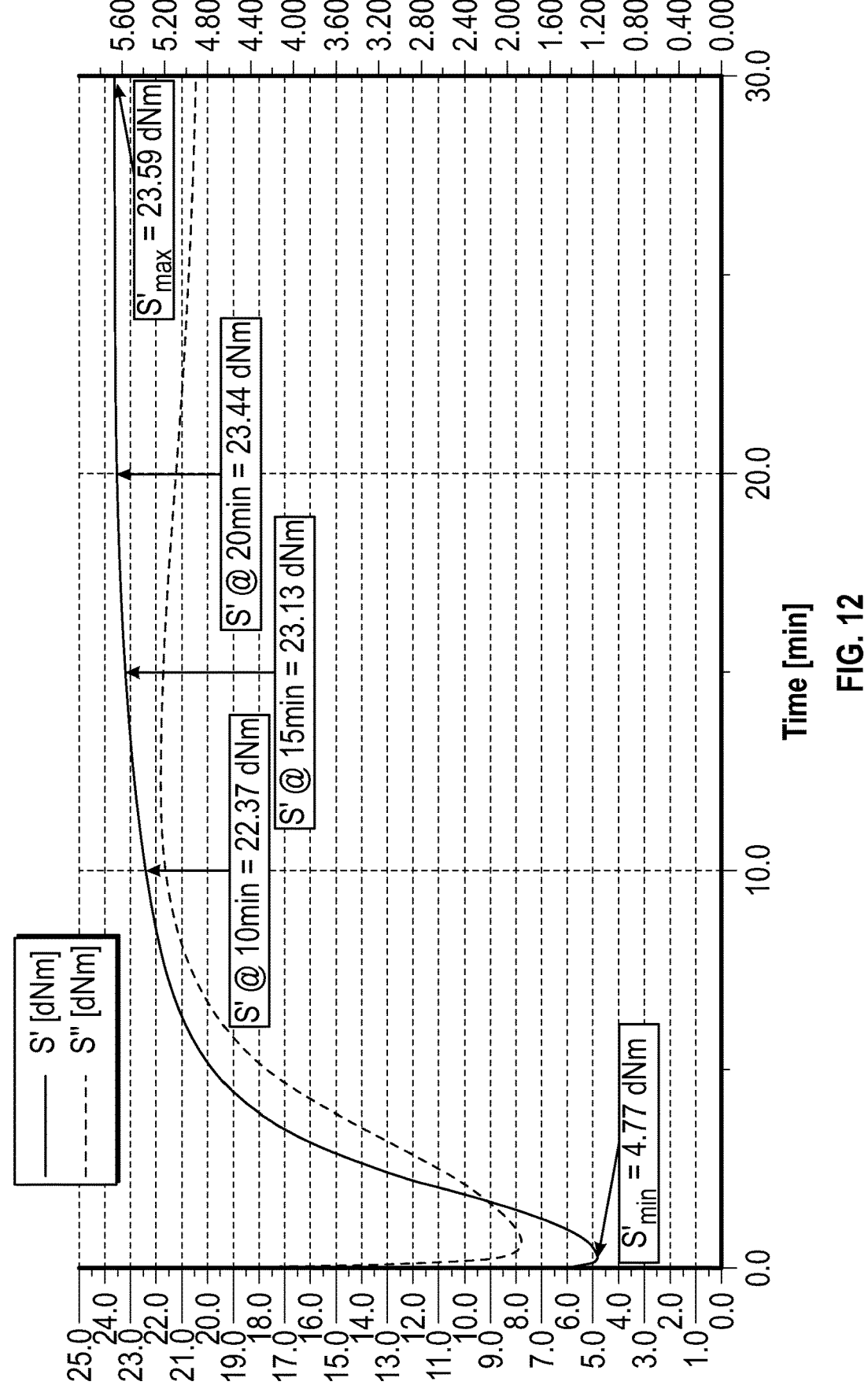
FIG. 12 is a graph showing Young's Modulus data for Baseline:CMP-XL (1:2).
Figure 13:
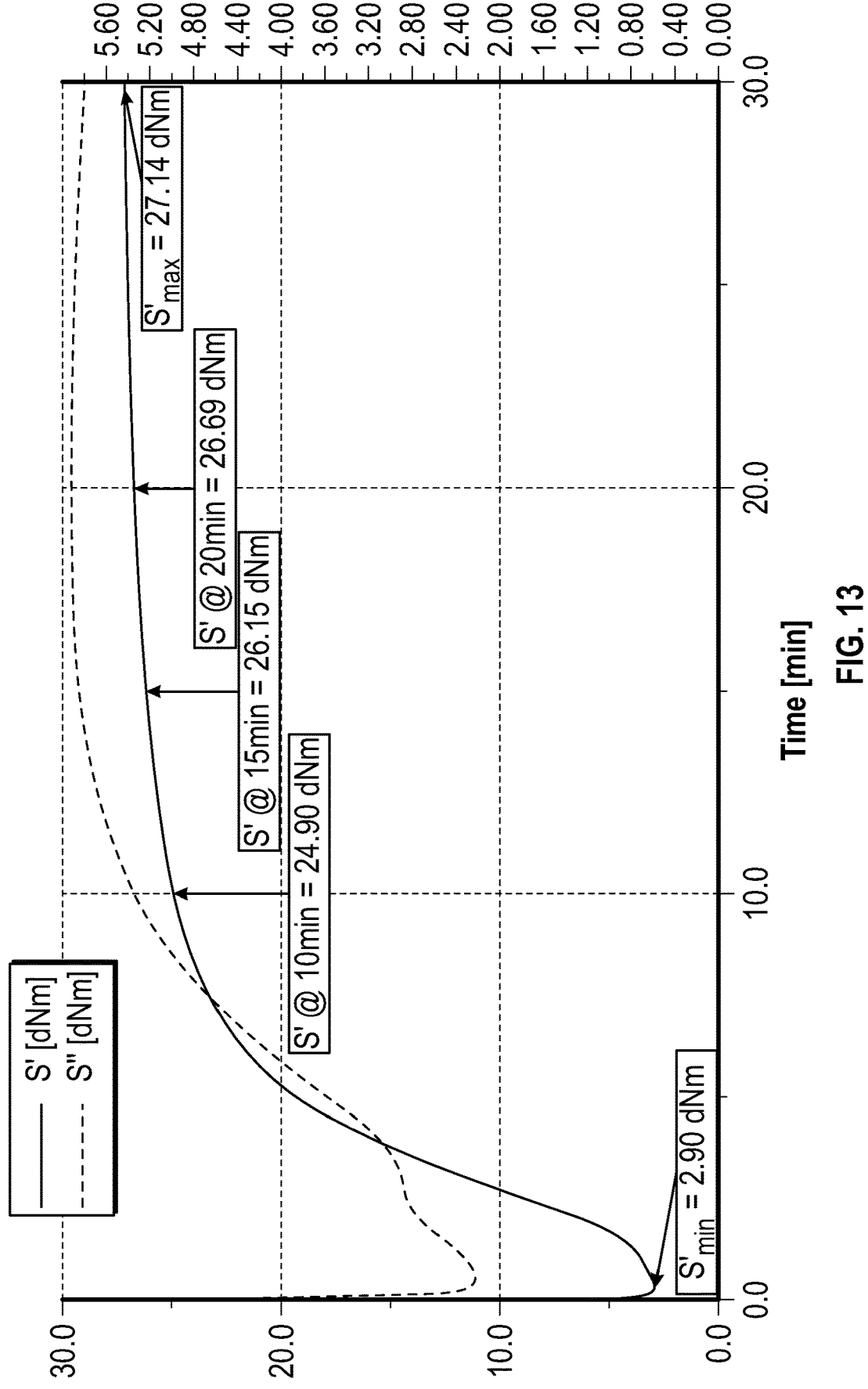
FIG. 13 is a graph showing Young's Modulus data for Baseline:CMP-XL (2:1).
Figure 14:
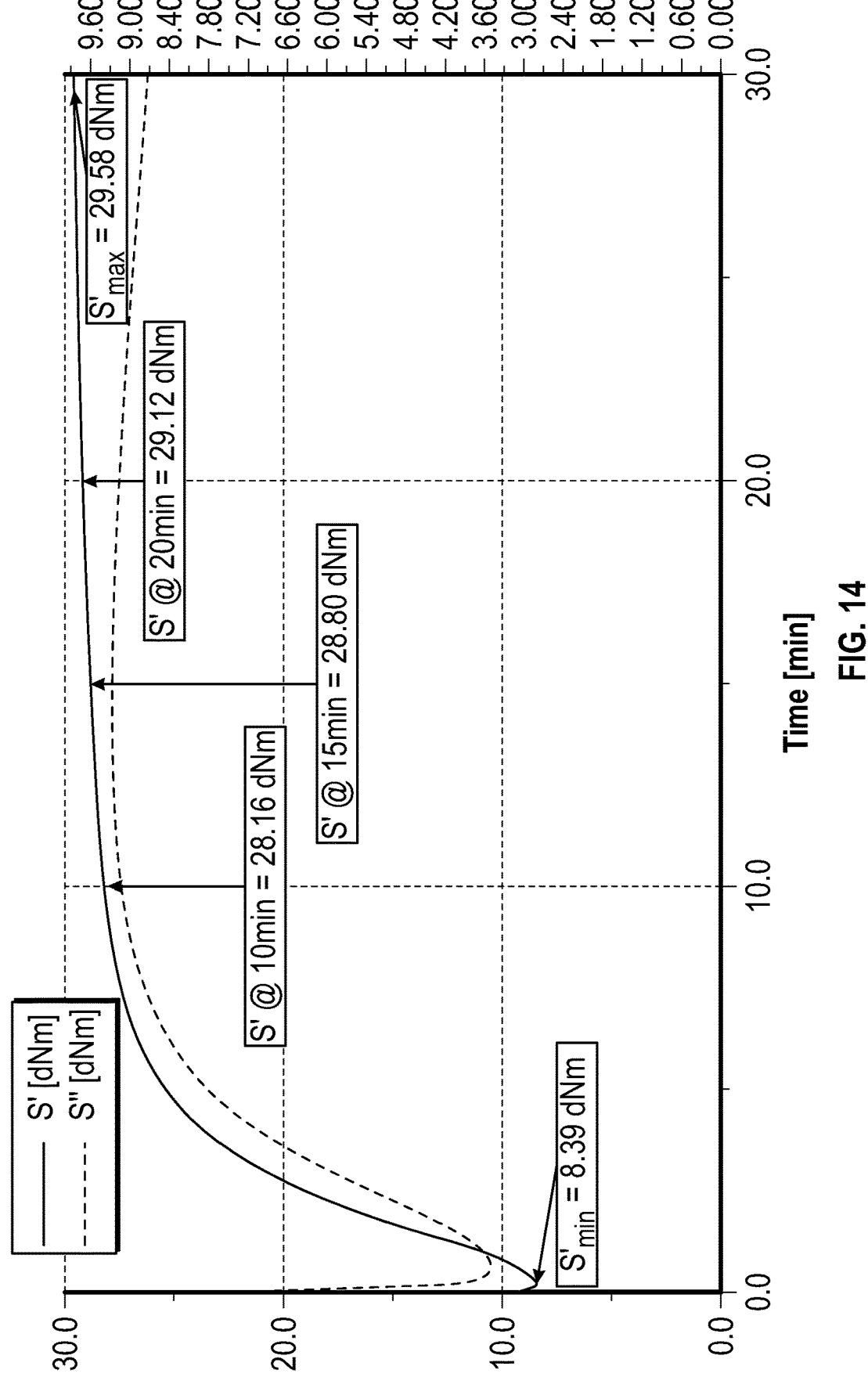
FIG. 14 is a graph showing Young's Modulus data for Baseline:SMP-XL (1:2).
Figure 15:
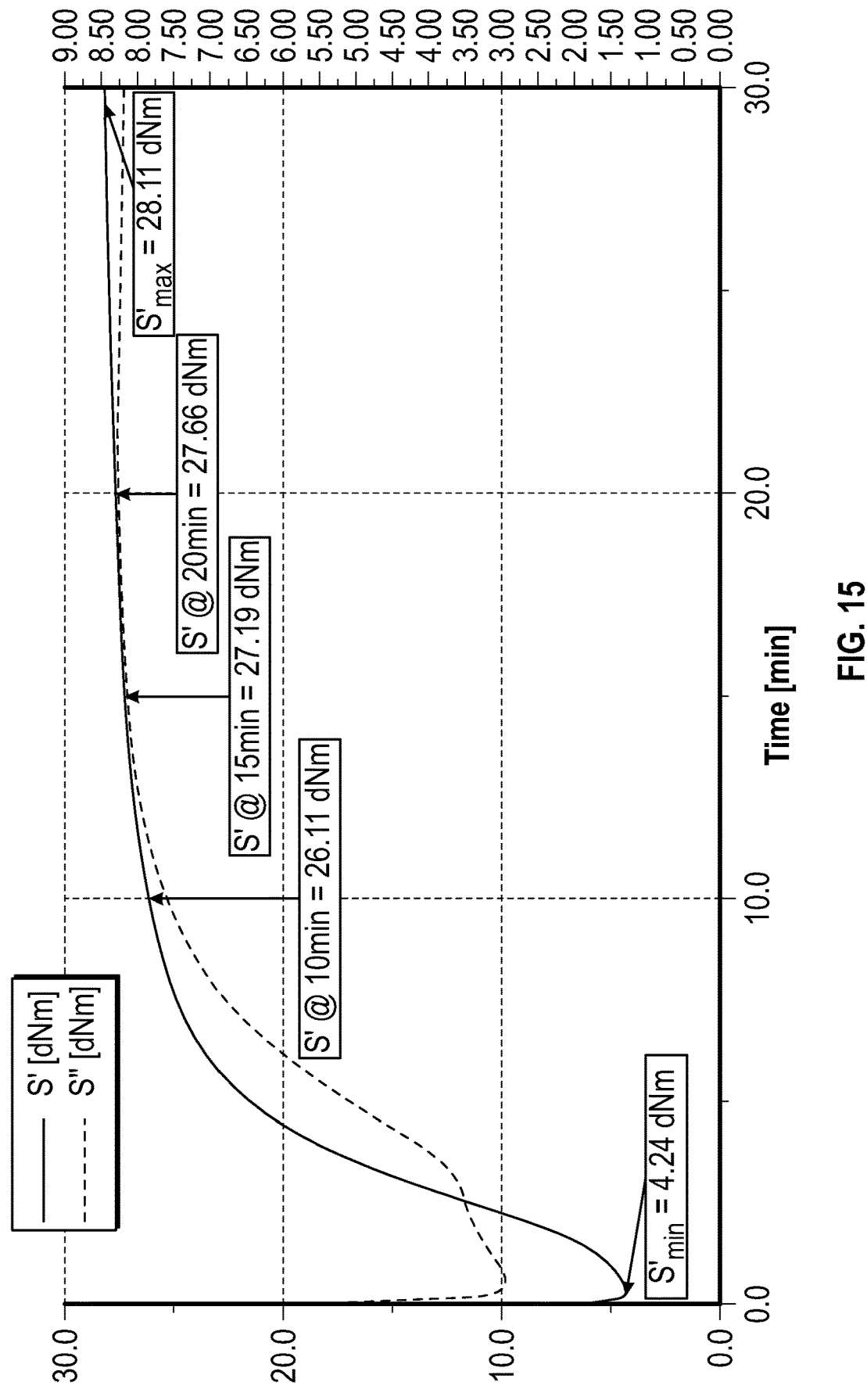
FIG. 15 is a graph showing Young's Modulus data for Baseline:SMP-XL (2:1).
Figure 16:
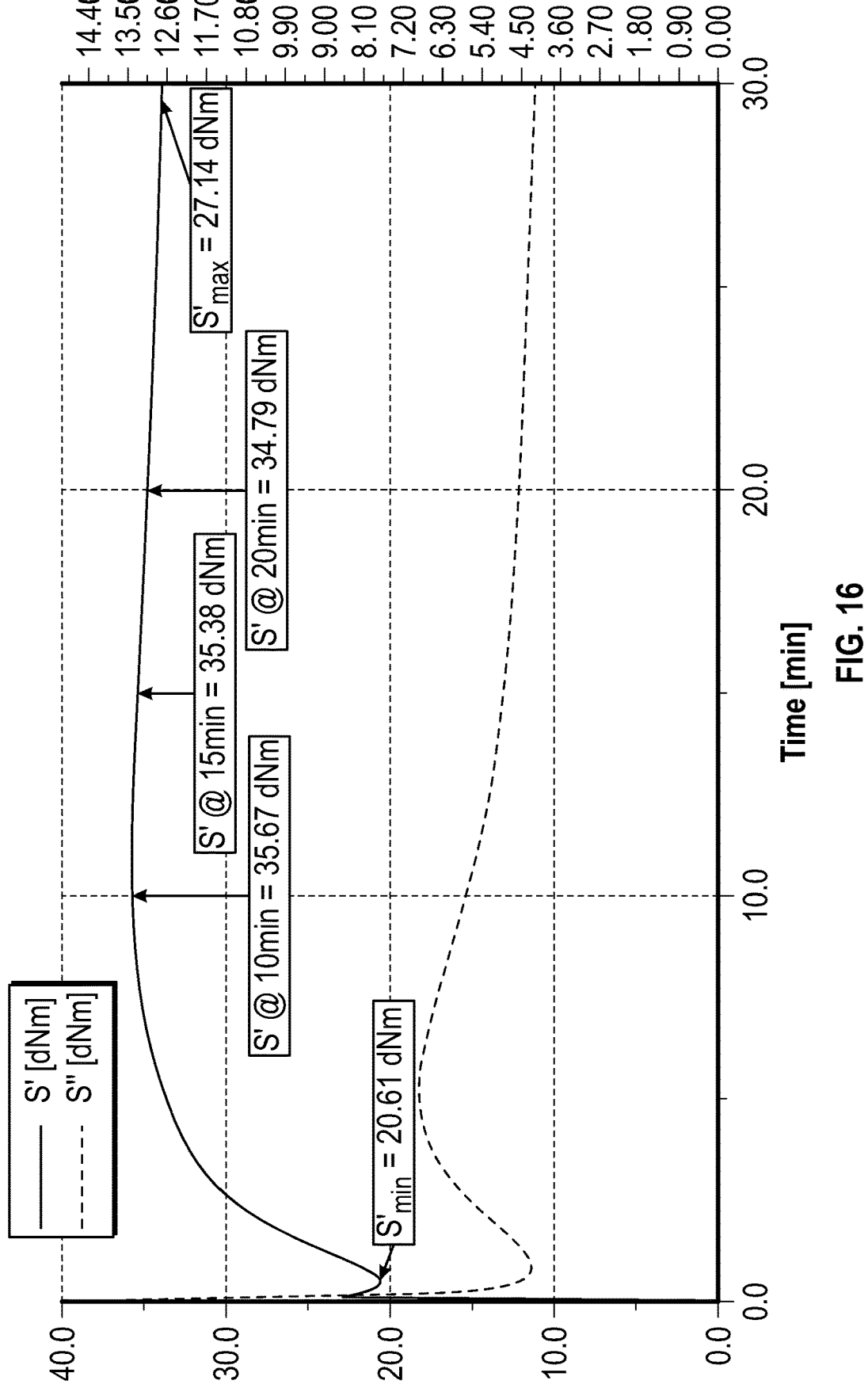
FIG. 16 is a graph showing Young's Modulus data for SMP-XL, respectively.
Figure 17:
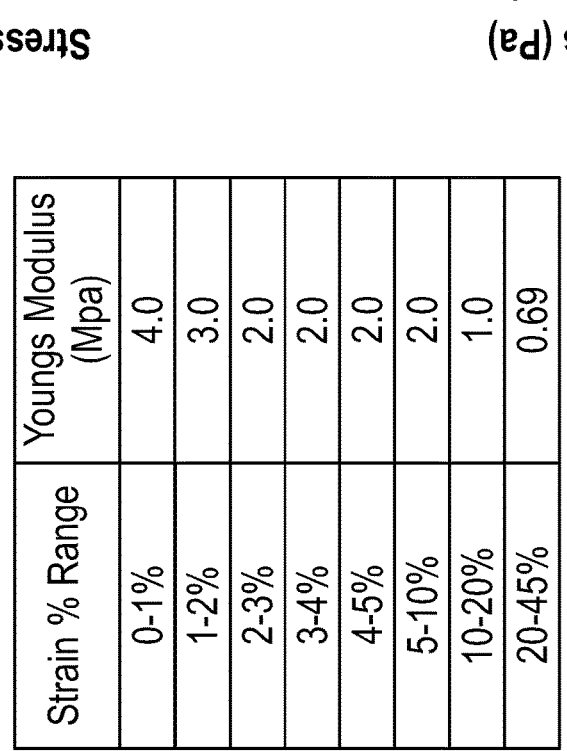
FIG. 17 provides pull testing data for the SBR-1502 (Lion) Baseline.
Figure 18:
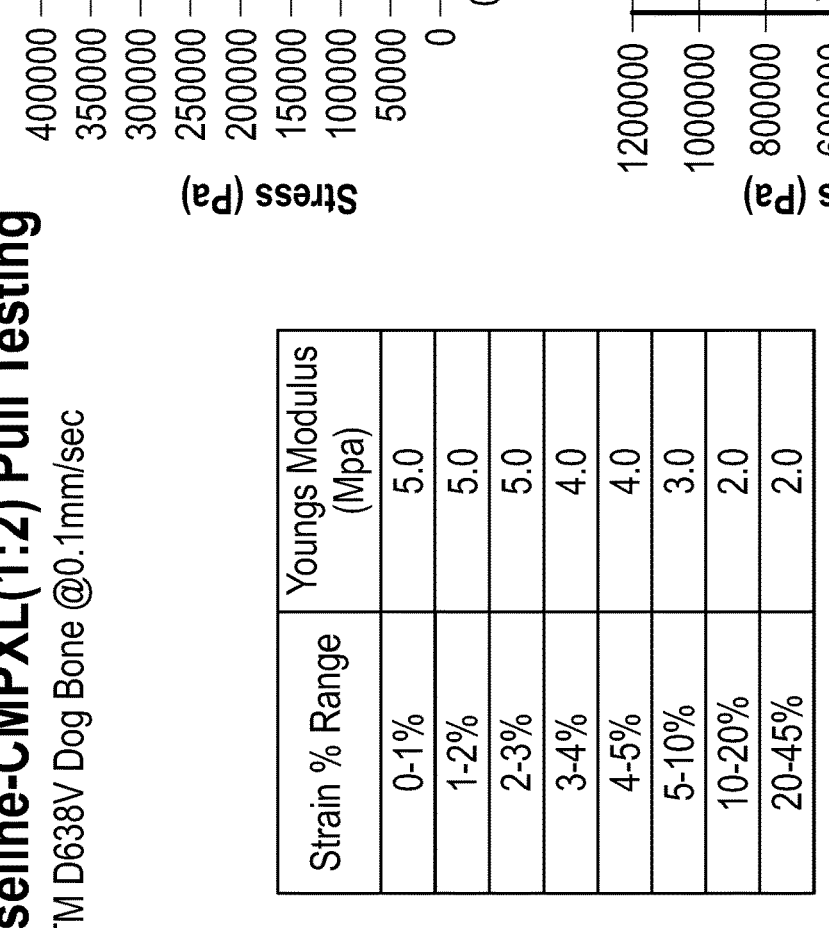
FIG. 18 provides pull testing data for Baseline:CMP-XL (1:2).
Figure 19:
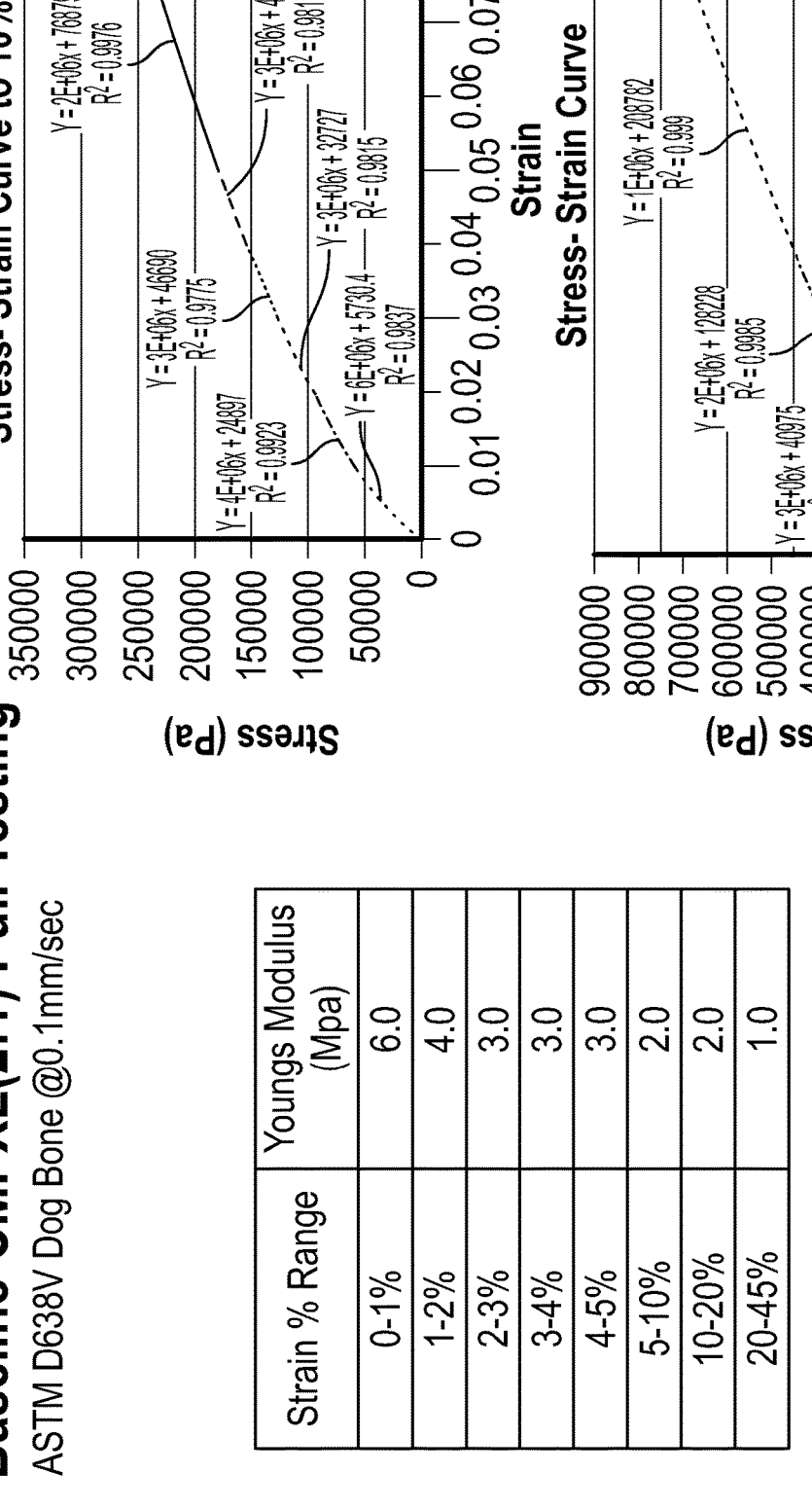
FIG. 19 provides pull testing data for Baseline:CMP-XL (2:1).
Figure 20:
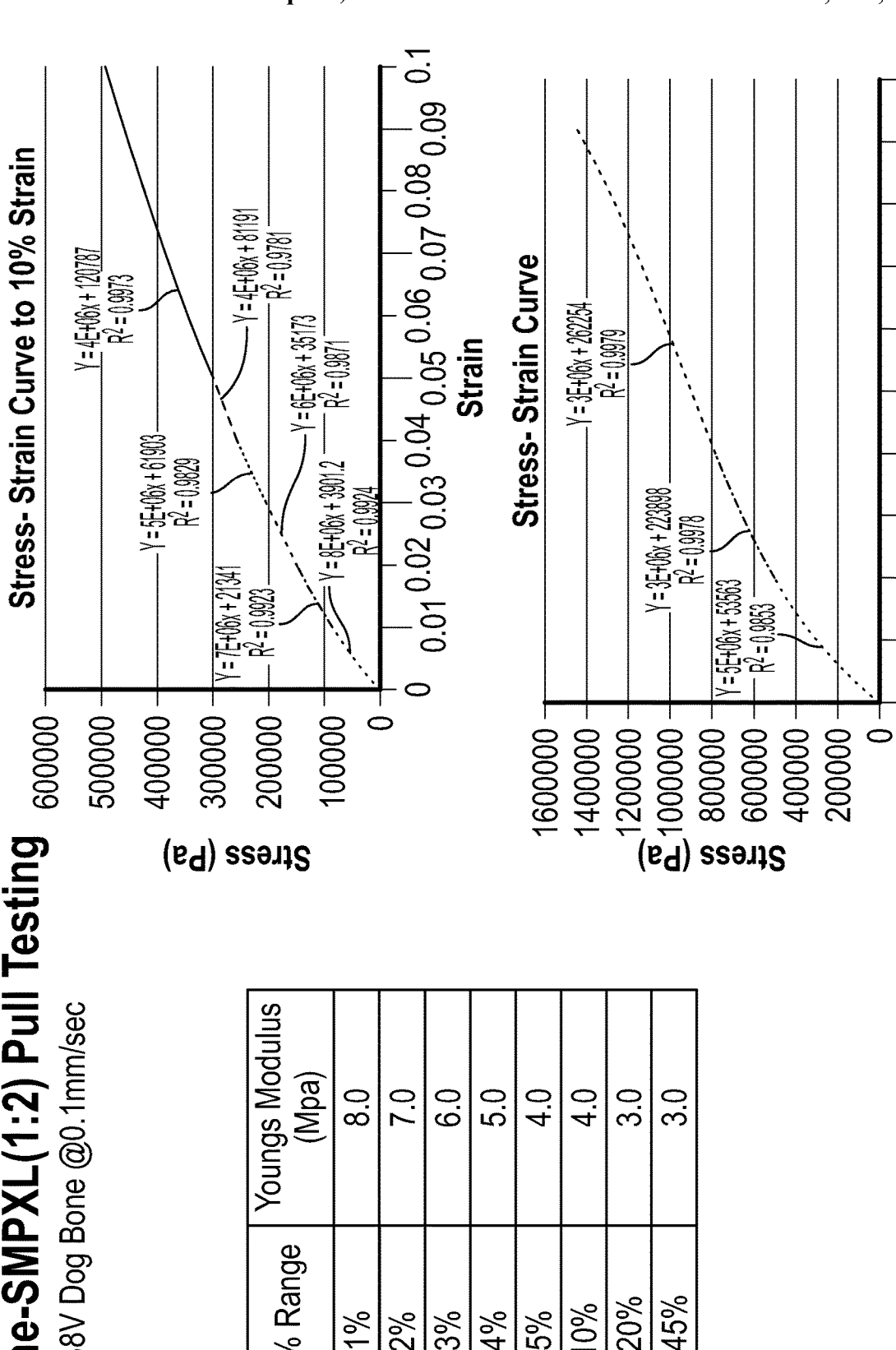
FIG. 20 provides pull testing data for Baseline:SMP-XL (1:2).

SBR 1502 Baseline was mixed with Stage 2 PTR Material at a weight ratio of 1:1 in a twin screw, counterrotating, extruder barrel, where it was subjected to crosslinking to yield a SBR 1052-Stage 2 PTR Blend. The physical properties of the resulting blend were tested. Test Results after isothermal curing at 160° C. are provided in Table 8. FIG. 10 is a graph showing Young's Modulus data for the SBR 1502 Baseline-Stage 2 PTR Blend.

TABLE 8

| SBR1502(Lion)-Silica | | |
|---|---|---|
| Test 6 | | |
| 1. Isotherm | | |
| Strain | 1.00 | [GRAD] |
| Frequency | 1.70 | [Hz] |
| Test Temperature | 160.00 | [° C.] |
| Offset | 0.00 | [GRAD] |
| Closing Pressure | 4.01 | [bar] |
| Range | 0-200 | [dNm] |
| Time/Step Isotherm | 30.00 | [min] |
| S' max [dNm] | | 16.08 |
| S' min [dNm] | | 1.13 |
| S' @ 1.0' test time [dNm] | | 1.13 |
| S' @ 10.0' test time [dNm] | | 1.59 |
| S' @ 20.0' test time [dNm] | | 12.25 |
| S' @ 50% test time [dNm] | | 6.41 |
| TC 10 [min] | | 12.03 |
| TC 20 [min] | | 13.41 |
| TC 50 [min] | | 16.50 |
| TC 90 [min] | | 24.22 |
| Scorch time (ts 1) [min] | | 11.33 |
| Scorch time (ts 2) [min] | | 12.59 |
| Peak rate (s'/min) [dNm/min] | | 1.55 |

The SBR 1052-Stage 2 PTR Blend exhibited superior properties to SBR 1502-PTR Blend.

Isothermal RPA (Rubber Process Analyzer) Curing Tests

Test conditions for isothermal testing were at 160° C., 1 deg, 1.7 Hz, and 4 bar. Samples tested included the following:

SBR-1502 (Lion) Baseline

Styrene-Butadiene Rubber (SBR) (SBR 1502 Elastomer from Lion Elastomers LLC, Port Neches, TX), served as a baseline material, and as a blend component, referred to below as "SBR 1502 Baseline".

Baseline:CMP-XL (2:1) and Baseline:CMP-XL (1:2)

An OMC (copper acetate) was subjected to dry mixing-grinding with 30 mesh (600 micron) ground tire rubber (GTR) in a ratio by weight of 2:100 (the weight of OMC was 2% of the weight of the GTR when the dry compound OMC was added to the GTR before it entered the reactor). A twin screw, counterrotating, extruder barrel reactor was employed. The methodology employed was based on that disclosed in U.S. Pat. Nos. 10,662,320, 10,626,275, and 10,800,906, the contents of which are hereby incorporated by reference in their entireties. The resulting material is referred to herein as "CMP. The CMP was mixed with SBR-1502 (Lion) Baseline in a ratio of 2 parts by weight SBR-1502 (Lion) Baseline to 1 part by weigh CMP, and the mixture was crosslinked to yield Baseline:CMP-XL (2:1). The CMP was mixed with SBR-1502 (Lion) Baseline in a ratio of 1 part by weight SBR-1502 (Lion) Baseline to 2 part by weigh CMP, and the mixture was crosslinked to yield Baseline:CMP-XL (1:2). A twin screw, counterrotating, extruder barrel reactor was employed for crosslinking.

SMP-XL, Baseline:SMP-XL (1:2), and Baseline:SMP-XL (2:1)

An OMC (copper acetate) was deposited on an APSP (HI-Sil™ 134G micro granules, PPG Industries, Inc., Monroeville, PA) at a weight ratio of 1:10 (OMC:134G) by sputter coating to a thickness of 5-10 nm to yield OMC/APSP composite. 30 mesh (600 micron) ground tire rubber (GTR) was mixed with the OMC/APSP composite by metering/mixing the composite into an un-modified stream of ground tire rubber as a homogenous, dry maw (weight ratio of OMC to GTR of 2:100). This homogeneous, dry maw was then forced, by a stuffing box, into a twin screw, counterrotating, extruder barrel where it was subjected to a pulsed, high compression, electro-mechanical and acoustic environment. The resulting material is referred to herein as "SMP". The SMP was mixed with SBR-1502 (Lion) Baseline in a ratio of 1 part by weight SBR-1502 (Lion) Baseline to 2 part by weigh SMP, and the mixture was crosslinked to yield Baseline:SMP-XL (1:2). The SMP was mixed with SBR-1502 (Lion) Baseline in a ratio of 2 parts by weight SBR-1502 (Lion) Baseline to 1 part by weigh SMP, and the mixture was crosslinked to yield Baseline:SMP-XL (2:1). The SMP was subjected to crosslinking to yield SMP-XL. A twin screw, counterrotating, extruder barrel reactor was employed for crosslinking.

Test Results after isothermal curing at 160° C. are provided in Tables 9, 10, 11, 12, 13, and 14 for SBR-1502 (Lion) Baseline, Baseline:CMP-XL (1:2), Baseline:CMP-XL (2:1), Baseline:SMP-XL (1:2), Baseline:SMP-XL (2:1), and SMP-XL, respectively. FIGS. 11, 12, 13, 14, 15, and 16 are graphs showing Young's Modulus data for SBR-1502 (Lion) Baseline, Baseline:CMP-XL (1:2), Baseline:CMP-XL (2:1), Baseline:SMP-XL (1:2), Baseline:SMP-XL (2:1), and SMP-XL, respectively.

TABLE 9

| SBR-1502 (Lion) Baseline ASTM D5289 | | |
|---|---|---|
| 1. Isotherm | | |
| Strain | 1.00 | [GRAD] |
| Frequency | 1.70 | [Hz] |
| Test Temperature | 160.00 | [° C.] |
| Offset | 0.00 | [GRAD] |
| Closing Pressure | 4.01 | [bar] |
| Range | 0-200 | [dNm] |
| Time/Step | 30.00 | [min] |
| Isotherm | | |
| S' max [dNm] | | 29.26 |
| S' min [dNm] | | 3.36 |
| S' @ 1.0' test time [dNm] | | 3.51 |
| S' @ 10.0' test time [dNm] | | 18.08 |
| S' @ 20.0' test time [dNm] | | 27.20 |
| S' @ 50% test time [dNm] | | 24.58 |
| TC 10 [min] | | 5.26 |
| TC 20 [min] | | 6.45 |
| TC 50 [min] | | 9.22 |
| TC 90 [min] | | 18.61 |
| Scorch time (ts 1) [min] | | 3.77 |
| Scorch time (ts 2) [min] | | 4.87 |
| Peak rate (s'/min) [dNm/min] | | 2.99 |

TABLE 10

| Baseline:CMP-XL (1:2) | | |
|---|---|---|
| 1. Isotherm | | |
| Strain | 1.00 | [GRAD] |
| Frequency | 1.70 | [Hz] |
| Test Temperature | 160.00 | [° C.] |
| Offset | 0.00 | [GRAD] |
| Closing Pressure | 4.01 | [bar] |
| Range | 0-200 | [dNm] |
| Time/Step | 30.00 | [min] |
| Isotherm | | |
| S' max [dNm] | | 23.59 |
| S' min [dNm] | | 4.77 |
| S' @ 1.0' test time [dNm] | | 5.99 |
| S' @ 10.0' test time [dNm] | | 22.37 |
| S' @ 20.0' test time [dNm] | | 23.44 |
| S' @ 50% test time [dNm] | | 23.13 |
| TC 10 [min] | | 1.16 |
| TC 20 [min] | | 1.56 |
| TC 50 [min] | | 2.67 |
| TC 90 [min] | | 7.81 |
| Scorch time (ts 1) [min] | | 0.92 |
| Scorch time (ts 2) [min] | | 1.20 |
| Peak rate (s'/min) [dNm/min] | | 5.46 |

TABLE 11

| Baseline:CMP-XL (2:1) | | |
|---|---|---|
| 1. Isotherm | | |
| Strain | 1.00 | [GRAD] |
| Frequency | 1.70 | [Hz] |
| Test Temperature | 160.00 | [° C.] |
| Offset | 0.00 | [GRAD] |
| Closing Pressure | 4.02 | [bar] |
| Range | 0-200 | [dNm] |
| Time/Step | 30.00 | [min] |
| Isotherm | | |
| S' max [dNm] | | 27.14 |
| S' min [dNm] | | 2.90 |
| S' @ 1.0' test time [dNm] | | 3.50 |
| S' @ 10.0' test time [dNm] | | 24.90 |
| S' @ 20.0' test time [dNm] | | 26.69 |

TABLE 11-continued

| Baseline:CMP-XL (2:1) | |
|---|---|
| S' @ 50% test time [dNm] | 26.15 |
| TC 10 [min] | 1.76 |
| TC 20 [min] | 2.29 |
| TC 50 [min] | 3.73 |
| TC 90 [min] | 9.60 |
| Scorch time (ts 1) [min] | 1.26 |
| Scorch time (ts 2) [min] | 1.65 |
| Peak rate (s'/min) [dNm/min] | 5.40 |

TABLE 12

| Baseline:SMP-XL (1:2) | | |
|---|---|---|
| 1. Isotherm | | |
| Strain | 1.00 | [GRAD] |
| Frequency | 1.70 | [Hz] |
| Test Temperature | 160.00 | [° C.] |
| Offset | 0.00 | [GRAD] |
| Closing Pressure | 4.00 | [bar] |
| Range | 0-200 | [dNm] |
| Time/Step | 30.00 | [min] |
| Isotherm | | |
| S' max [dNm] | | 29.58 |
| S' min [dNm] | | 8.39 |
| S' @ 1.0' test time [dNm] | | 10.90 |
| S' @ 10.0' test time [dNm] | | 28.16 |
| S' @ 20.0' test time [dNm] | | 29.12 |
| S' @ 50% test time [dNm] | | 28.80 |
| TC 10 [min] | | 0.90 |
| TC 20 [min] | | 1.29 |
| TC 50 [min] | | 2.46 |
| TC 90 [min] | | 7.62 |
| Scorch time (ts 1) [min] | | 0.63 |
| Scorch time (ts 2) [min] | | 0.88 |
| Peak rate (s'/min) [dNm/min] | | 6.11 |

TABLE 13

| Baseline:SMP-XL (2:1) | | |
|---|---|---|
| 1. Isotherm | | |
| Strain | 1.00 | [GRAD] |
| Frequency | 1.70 | [Hz] |
| Test Temperature | 160.00 | [° C.] |
| Offset | 0.00 | [GRAD] |
| Closing Pressure | 4.01 | [bar] |
| Range | 0-200 | [dNm] |
| Time/Step | 30.00 | [min] |
| Isotherm | | |
| S' max [dNm] | | 28.11 |
| S' min [dNm] | | 4.24 |
| S' @ 1.0' test time [dNm] | | 5.02 |
| S' @ 10.0' test time [dNm] | | 26.11 |
| S' @ 20.0' test time [dNm] | | 27.66 |
| S' @ 50% test time [dNm] | | 27.19 |
| TC 10 [min] | | 1.56 |
| TC 20 [min] | | 2.05 |
| TC 50 [min] | | 3.39 |
| TC 90 [min] | | 9.02 |
| Scorch time (ts 1) [min] | | 1.10 |
| Scorch time (ts 2) [min] | | 1.47 |
| Peak rate (s'/min) [dNm/min] | | 5.71 |

TABLE 14

| SMP-XL (100%) | | |
| --- | --- | --- |
| 1. Isotherm | | |
| Strain | 1.00 [GRAD] | |
| Frequency | 1.70 [Hz] | |
| Test Temperature | 160.00 [° C.] | |
| Offset | 0.00 [GRAD] | |
| Closing Pressure | 4.01 [bar] | |
| Range | 0-200 [dNm] | |
| Time/Step | 30.00 [min] | |
| Isotherm | | |
| S' max [dNm] | | 35.70 |
| S' min [dNm] | | 20.61 |
| S' @ 1.0' test time [dNm] | | 22.55 |
| S' @ 10.0' test time [dNm] | | 35.67 |
| S' @ 20.0' test time [dNm] | | 34.79 |
| S' @ 50% test time [dNm] | | 35.38 |
| TC 10 [min] | | 0.91 |
| TC 20 [min] | | 1.16 |
| TC 50 [min] | | 2.04 |
| TC 90 [min] | | 5.58 |
| Scorch time (ts 1) [min] | | 0.82 |
| Scorch time (ts 2) [min] | | 1.00 |
| Peak rate (s'/min) [dNm/min] | | 6.08 |

Pull Testing

Figure 21:
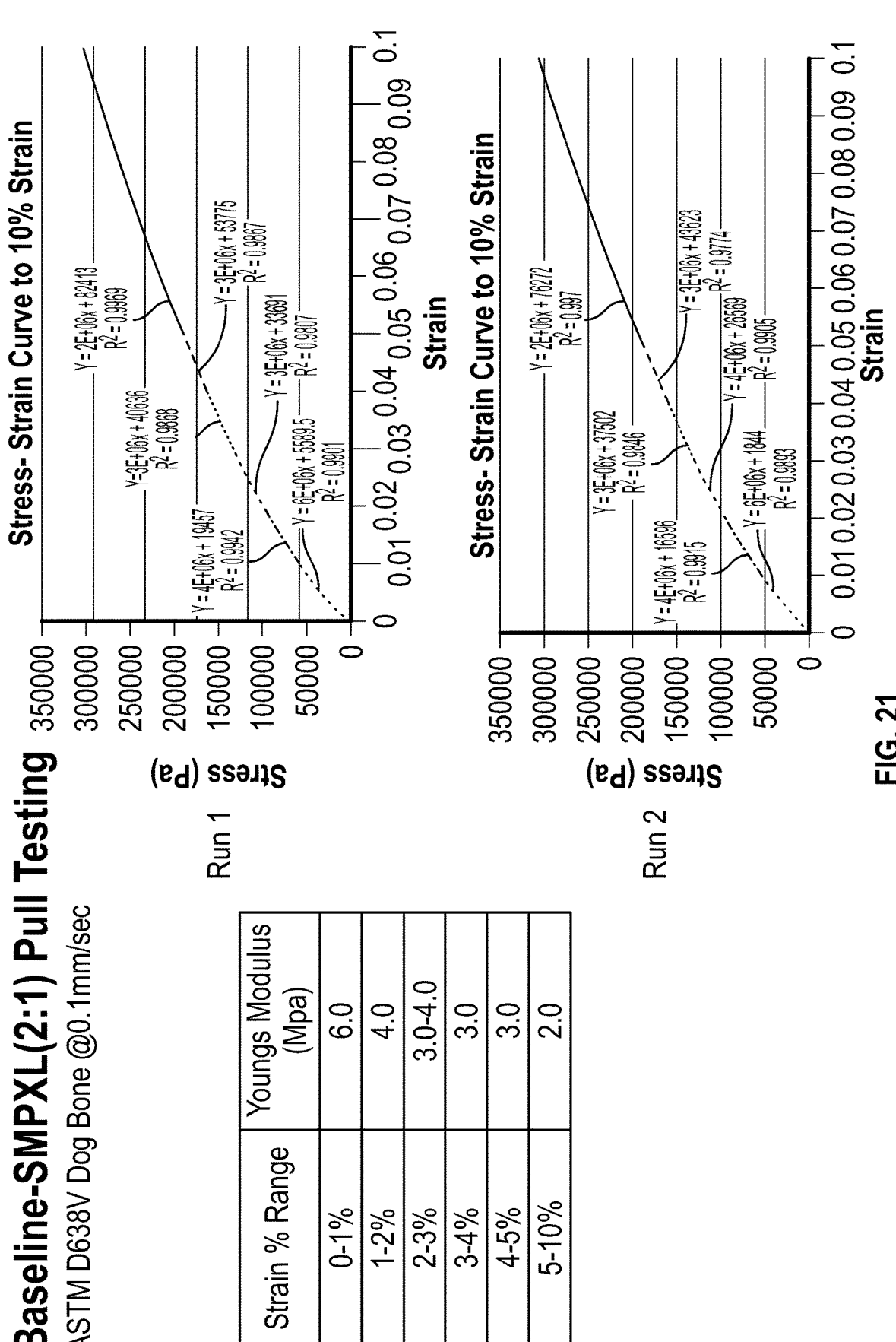
FIG. 21 provide pull testing data for the Baseline:SMP-XL (2:1).
Figure 22:
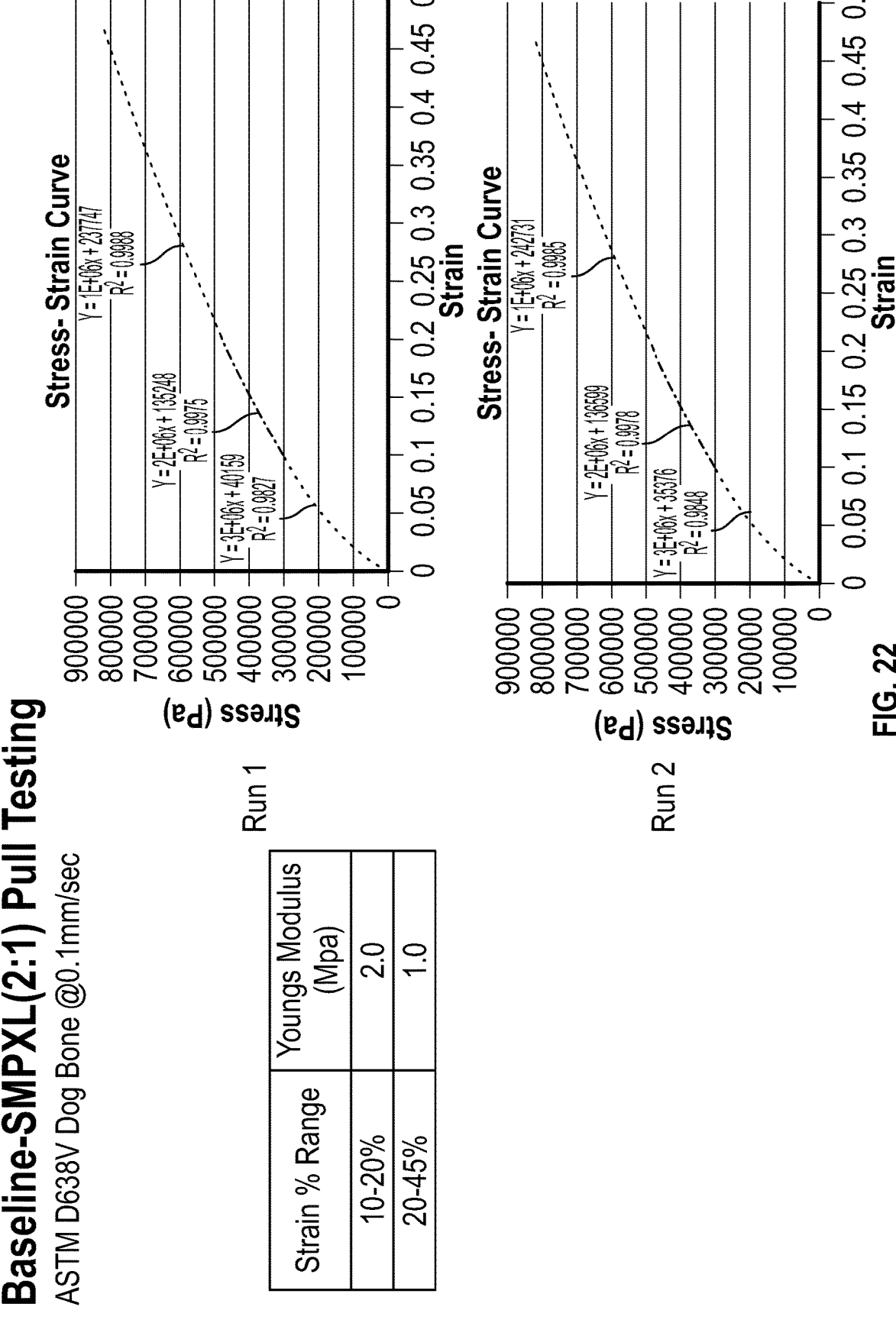
FIG. 22 provide pull testing data for the Baseline:SMP-XL (2:1).
Figure 23:
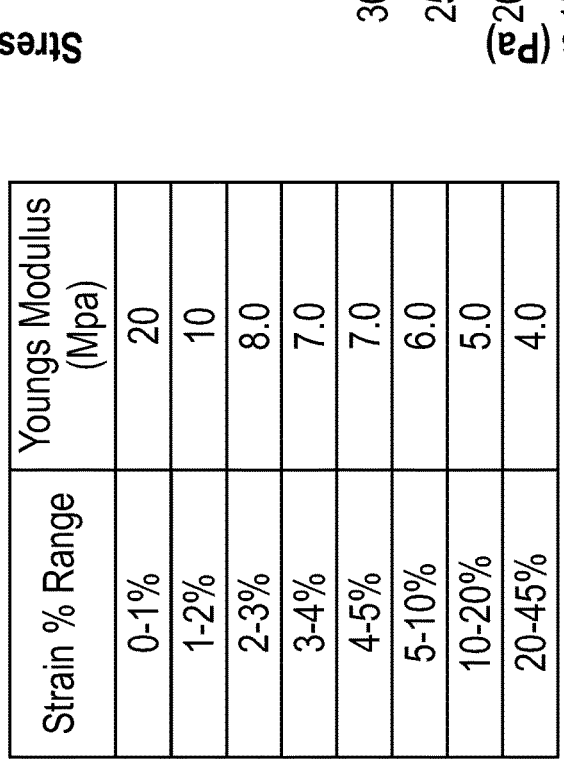
FIG. 23 provides pull testing data for SMP-XL.
Figure 24:
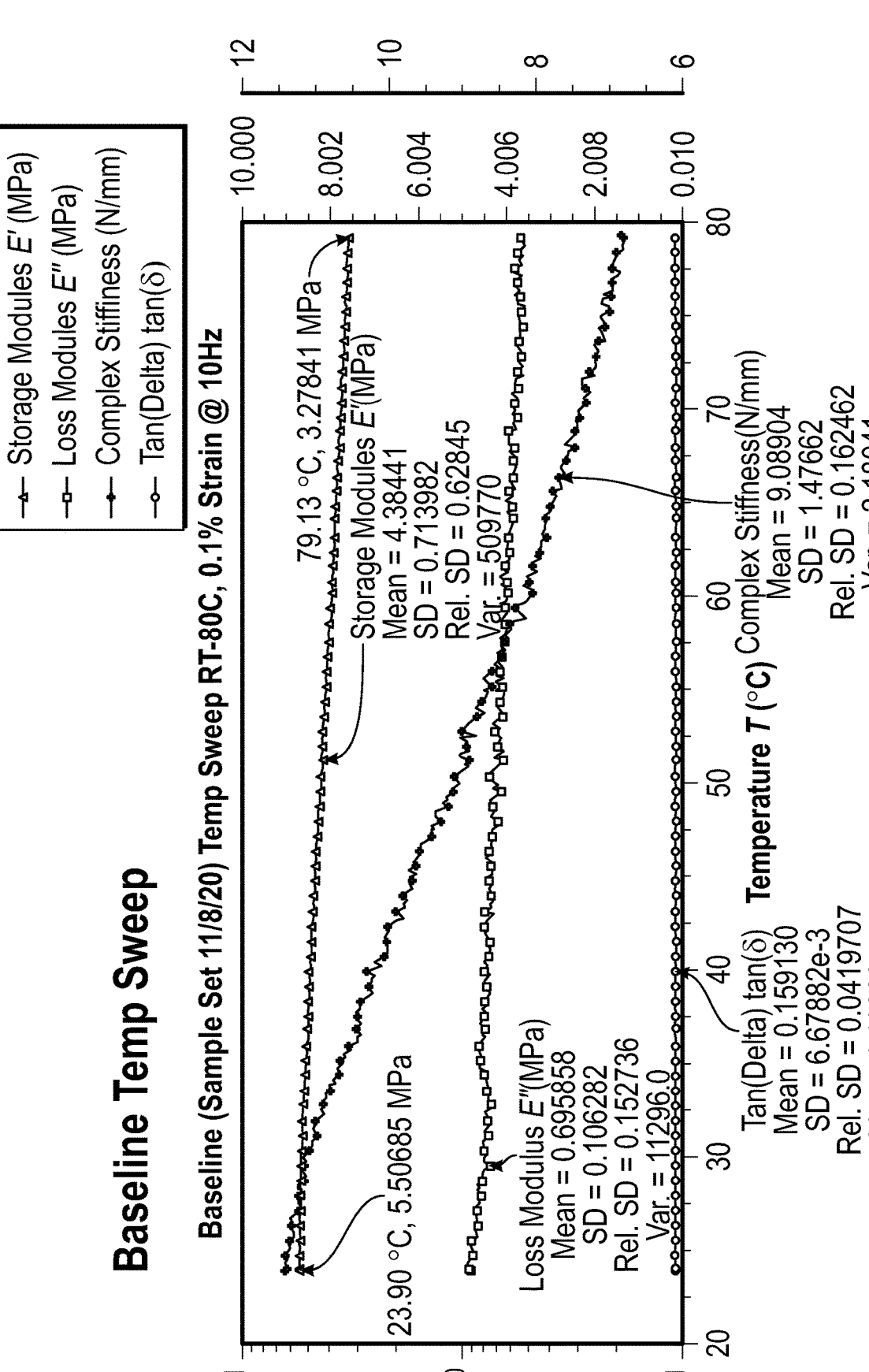
FIG. 24 provides temperature sweep testing data for the SBR-1502 (Lion) Baseline.

Pull testing was conducted as in ASTM D638V Dog Bone @ 0.1 mm/sec. FIGS. 17, 18, 19, and 20 provide pull testing data for the SBR-1502 (Lion) Baseline, Baseline:CMP-XL (1:2), Baseline:CMP-XL (2:1), and Baseline:SMP-XL (1:2), FIGS. 21 and 22 provide pull testing data for the Baseline: SMP-XL (2:1). FIG. 23 provides pull testing data for SMP-XL.

Temperature Sweep Testing

Figure 29:
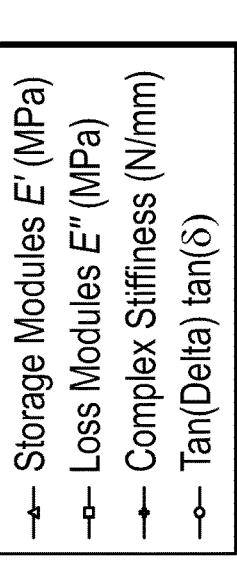
FIG. 29 provides temperature sweep testing data for Baseline:SMP-XL (2:1).

Temperature sweep testing was conducted to 80° C., 0.1% strain @ 10 Hz. FIGS. 24, 25, 26, and 27 provide temperature sweep testing data for the SBR-1502 (Lion) Baseline, Baseline:CMP-XL (1:2), Baseline:CMP-XL (2:1), and Baseline:SMP-XL (1:2), FIGS. 28 and 29 provide temperature sweep testing data for the Baseline:SMP-XL (2:1). FIG. 30 provides temperature sweep testing data for SMP-XL.

As demonstrated by the pull testing and temperature sweep testing, the SMP elastomer exhibited superior performance when compared to the Baseline and CMP elastomer in terms of tensile strength through the temperature sweep, and a dramatically superior storage modulus when compared to Baseline. Cure times were also dramatically reduced for the SMP elastomer, strength, and stiffness and Young's modulus were superior compared to baseline and the CMP elastomer.

The rubbers and rubber-containing materials of the various embodiments may be manufactured, e.g., into articles or useful materials. In certain embodiments, rubber and rubber goods meeting one or more MIL-R specification are provided. The articles (e.g., engineered articles) can include but are not limited to tire tread, tire sidewall, roofing membrane, high dielectric electrical tape, tank lining, reservoir lining, trench lining, bridge underlayment, foundation waterproofing, parking garage waterproofing, hose, belt, molding, or other rubber goods prepared from molded rubber or rubber sheeting (e.g., gaskets, tubing, shock absorbing materials, floor mats and bed liners for vehicles, mats and flooring materials for commercial and residential construction, underlayments for floors, decking, and concrete, sound proofing, etc.). Other products include elasticized bands in clothing and hair ties, dishwashing gloves, toys, jar seals and tires, welcome mats, garden hoses. Other household rubber items include shoe soles, boots, raincoats, pond liners, mattresses and cushions, pillows, grips on garden tools, bathtub plugs, doorstops, earplugs, hot water bottles, aquarium tubing, faucet washers and backing for rugs. Stoppers for lab flasks and vials, chemical resistant mats and pads, prosthetics and other specialized products and equipment can be made from the rubber of the embodiments, as can rubber food and water bowls, chew toys and balls, foam rubber mattress pads, stall mats, elasticized vet wraps, flea collars, shed mitts and rubber combs, mouse pads, keyboards, adhesives and rolling chair wheels, anti-fatigue mats, carpet underlayment, head phone pads and rubber stamps, inflatable beds for camping, playground tiles, rubber ducks, sportswear, scuba suits, vehicle components for civilian and military use; boat, ship, and submarine components for civilian or military use; airplane, passenger plane, and fighter jet components, railcar and train engine components, residential and commercial building products, factory or industrial or manufacturing components, clothing and footwear components.

Exemplary Methods and Elastomers

Method 1: A method for preparing a rubber-based elastomer, comprising: subjecting a mixture comprising vulcanized rubber particles and an antiferromagnetic material to a pressure, then releasing the pressure, whereby a sulfur bond of the vulcanized rubber is cleaved, whereby a rubber-based elastomer is obtained.

Method 2: Method 1, wherein the pressure is from 100-400 megapascals, wherein when the pressure is released photonic energy of a wavelength of from 200 to 500 nanometers is generated in a vicinity of the sulfur bond.

Method 3: Method 1 or 2, wherein a sulfur-sulfur bond is cleaved.

Method 4: Any one of Methods 1-3, wherein a sulfur-carbon bond is cleaved.

Method 5: Any one of Methods 1-4, wherein the antiferromagnetic material comprises a metal selected from the group consisting of Co, Cu, Ni, Zn, and Mn.

Method 6: Any one of Methods 1-4, wherein the antiferromagnetic material comprises a rare earth element.

Method 7: Any one of Methods 1-4, wherein the antiferromagnetic material comprises a copper oxide, a cobalt oxide, a magnesium oxide, or a manganese oxide.

Method 8: Any one of Methods 1-4, wherein the antiferromagnetic material comprises KNiF, SrNiF, or BaTiO.

Method 9: Any one of Methods 1-4, wherein the antiferromagnetic material comprises copper acetate.

Method 10: Any one of Methods 1-4, wherein the antiferromagnetic material consists of copper acetate.

Method 11: Any one of Methods 1-4, wherein the antiferromagnetic material comprises a copper peroxide.

Method 12: Any one of Methods 1-11, wherein the antiferromagnetic material has a crystalline structure, wherein upon application of the pressure a 90 degree non-stress geometry of the antiferromagnetic material is distorted to up to a 135 degree fully stressed geometry.

Method 13: Any one of Methods 1-12, wherein the mixture comprises 0.01% by weight or less water.

Method 14: Any one of Methods 1-13, wherein the vulcanized rubber crumbs have a particle size greater than 200 mesh.

Method 15: Any one of Methods 1-14, wherein the antiferromagnetic material is employed at a concentration of from 0.01% to 0.5% by weight of the mixture.

Method 16: Any one of Methods 1-15, wherein the antiferromagnetic material is employed at a concentration of 0.5% by weight of the mixture.

Method 17: Any one of Methods 1-16, wherein the antiferromagnetic material is dry coated on the vulcanized rubber particles.

Method 18: Any one of Methods 1-16, wherein the antiferromagnetic material is sputtered onto the vulcanized rubber particles.

Method 19: Any one of Methods 1-16, wherein the antiferromagnetic material is laser sputtered onto the vulcanized rubber particles.

Method 20: Any one of Methods 1-16, wherein the antiferromagnetic material is plasma coated onto the vulcanized rubber particles.

Method 21: Any one of Methods 1-16, wherein the antiferromagnetic material is supported on a supporting particle.

Method 22: Method 21, wherein the supporting particle has a surface area of 50 $m^2/g$ to 1000 $m^2/g$.

Method 23: Any one of Methods 21-22, wherein the supporting particle is selected from the group consisting of an oxide, a metal, a refractory material, a ceramic, or a glass.

Method 24: Any one of Methods 21-23, wherein the supporting particle is porous.

Method 25: Any one of Methods 21-24, wherein the supporting particle is amorphous silica, e.g., having a surface area of 160 $m^2/g$.

Method 26: Any one of Methods 21-25, wherein the antiferromagnetic material is deposited on the supporting particle by sputtering, laser sputtering, laser ablation, e-beam evaporation, physical or chemical vapor deposition, plasma enhanced chemical vapor deposition, evaporative deposition, reactive deposition, atomic layer deposition, or plasma coating.

Method 27: Any one of Methods 1-26, wherein pressure is applied by passing the mixture through a multi-lobe, co-rotating mixer extruder.

Method 28: Any one of Methods 1-27, wherein pressure is applied by passing the mixture between two rollers.

Method 29: Any one of Methods 1-28, wherein the mixture passes between the two rollers from 3 to 100 times.

Method 30: Any one of Methods 1-29, wherein the mixture passes between the two rollers from 3 to 10 times.

Method 31: Any one of Methods 1-30, wherein the mixture passes between the pinch rollers from 3 to 5 times.

Method 32: Any one of Methods 1-31, wherein the mixture further comprises one or more of a virgin rubber or a virgin elastomer or a synthetic rubber.

Method 33: Any one of Methods 1-32, wherein the two rollers have a nip of 0.007 inches to about 0.050 inches.

Method 34: Any one of Methods 1-33, wherein one of the two rollers rotates faster than the other.

Method 35: Any one of Methods 1-34, wherein one of the two rollers rotates faster than the other, optionally up to 1.15 times faster than the other.

Method 36: Any one of Methods 1-35, wherein one of the two rollers rotates faster than the other, optionally up to 1.15 times faster than the other.

Method 37: Any one of Methods 1-36, wherein one of the two rollers has a variable speed of from 5 to 150 rpm.

Method 38: Any one of Methods 1-37, wherein the two rollers have a variable speed of from 5 to 150 rpm.

Elastomer 39: An elastomer prepared by the method of any of Methods 1-38.

Elastomer 40: Elastomer 39, wherein the elastomer is subjected to crosslinking.

Elastomer 41: Any one of Elastomers 39-40, wherein the elastomer is fabricated into a rubber-containing article.

Elastomer 42: Elastomer 41, wherein the article is a new tire.

Elastomer 43: Elastomer 41, wherein the article is an engineered rubber article.

While the disclosure has been illustrated and described in detail in the drawings and foregoing description, such illustration and description are to be considered illustrative or exemplary and not restrictive. The disclosure is not limited to the disclosed embodiments. Variations to the disclosed embodiments can be understood and effected by those skilled in the art in practicing the claimed disclosure, from a study of the drawings, the disclosure and the appended claims.

All references cited herein are incorporated herein by reference in their entirety. To the extent publications and patents or patent applications incorporated by reference contradict the disclosure contained in the specification, the specification is intended to supersede and/or take precedence over any such contradictory material.

Unless otherwise defined, all terms (including technical and scientific terms) are to be given their ordinary and customary meaning to a person of ordinary skill in the art, and are not to be limited to a special or customized meaning unless expressly so defined herein. It should be noted that the use of particular terminology when describing certain features or aspects of the disclosure should not be taken to imply that the terminology is being re-defined herein to be restricted to include any specific characteristics of the features or aspects of the disclosure with which that terminology is associated. Terms and phrases used in this application, and variations thereof, especially in the appended claims, unless otherwise expressly stated, should be construed as open ended as opposed to limiting. As examples of the foregoing, the term 'including' should be read to mean 'including, without limitation,' 'including but not limited to,' or the like; the term 'comprising' as used herein is synonymous with 'including,' 'containing,' or 'characterized by,' and is inclusive or open-ended and does not exclude additional, unrecited elements or method steps; the term 'having' should be interpreted as 'having at least;' the term 'includes' should be interpreted as 'includes but is not limited to;' the term 'example' is used to provide exemplary instances of the item in discussion, not an exhaustive or limiting list thereof; adjectives such as 'known', 'normal', 'standard', and terms of similar meaning should not be construed as limiting the item described to a given time period or to an item available as of a given time, but instead should be read to encompass known, normal, or standard technologies that may be available or known now or at any time in the future; and use of terms like 'preferably,' 'preferred,' 'desired,' or 'desirable,' and words of similar meaning should not be understood as implying that certain features are critical, essential, or even important to the structure or function of the invention, but instead as merely intended to highlight alternative or additional features that may or may not be utilized in a particular embodiment of the invention. Likewise, a group of items linked with the conjunction 'and' should not be read as requiring that each and every one of those items be present in the grouping, but rather should be read as 'and/or' unless expressly stated otherwise. Similarly, a group of items linked with the conjunction 'or' should not be read as requiring mutual exclusivity among that group, but rather should be read as 'and/or' unless expressly stated otherwise.

Where a range of values is provided, it is understood that the upper and lower limit, and each intervening value between the upper and lower limit of the range is encompassed within the embodiments.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity. The indefinite article "a" or "an" does not exclude a plurality. A single processor or other unit may fulfill the functions of several items recited in the claims. The mere fact that certain measures are recited in mutually different dependent claims does not indicate that a combination of these measures cannot be used to advantage. Any reference signs in the claims should not be construed as limiting the scope.

It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

All numbers expressing quantities of ingredients, reaction conditions, and so forth used in the specification are to be understood as being modified in all instances by the term 'about.' Accordingly, unless indicated to the contrary, the numerical parameters set forth herein are approximations that may vary depending upon the desired properties sought to be obtained. At the very least, and not as an attempt to limit the application of the doctrine of equivalents to the scope of any claims in any application claiming priority to the present application, each numerical parameter should be construed in light of the number of significant digits and ordinary rounding approaches.

Furthermore, although the foregoing has been described in some detail by way of illustrations and examples for purposes of clarity and understanding, it is apparent to those skilled in the art that certain changes and modifications may be practiced. Therefore, the description and examples should not be construed as limiting the scope of the invention to the specific embodiments and examples described herein, but rather to also cover all modification and alternatives coming with the true scope and spirit of the invention.

What is claimed is:

1. A method for preparing a rubber-based elastomer, comprising:
   subjecting a mixture comprising vulcanized rubber particles and an antiferromagnetic material to a pressure, then releasing the pressure, whereby a sulfur bond of the vulcanized rubber is cleaved, whereby a rubber-based elastomer is obtained.

2. The method of claim 1, wherein the pressure is from 100-400 megapascals, wherein when the pressure is released photonic energy of a wavelength of from 200 to 500 nanometers is generated in a vicinity of the sulfur bond.

3. The method of claim 1, wherein a sulfur-sulfur bond is cleaved.

4. The method of claim 1, wherein a sulfur-carbon bond is cleaved.

5. The method of claim 1, wherein the antiferromagnetic material comprises a metal selected from the group consisting of Co, Cu, Ni, Zn, and Mn.

6. The method of claim 1, wherein the antiferromagnetic material comprises a rare earth element.

7. The method of claim 1, wherein the antiferromagnetic material comprises a copper oxide, a cobalt oxide, a magnesium oxide, or a manganese oxide.

8. The method of claim 1, wherein the antiferromagnetic material comprises $KNiF$, $SrNiF$, or $BaTiO$.

9. The method of claim 1, wherein the antiferromagnetic material comprises copper acetate.

10. The method of claim 1, wherein the antiferromagnetic material consists of copper acetate.

11. The method of claim 1, wherein the antiferromagnetic material comprises a copper peroxide.

12. The method of claim 1, wherein the antiferromagnetic material has a crystalline structure, wherein upon application of the pressure a 90 degree non-stress geometry of the antiferromagnetic material is distorted to up to a 135 degree fully stressed geometry.

13. The method of claim 1, wherein the mixture comprises 0.01% by weight or less water.

14. The method of claim 1, wherein the vulcanized rubber particles have a particle size greater than 200 mesh.

15. The method of claim 1, wherein the antiferromagnetic material is employed at a concentration of from 0.01% to 0.5% by weight of the mixture.

16. The method of claim 1, wherein the antiferromagnetic material is employed at a concentration of 0.5% by weight of the mixture.

17. The method of claim 1, wherein the antiferromagnetic material is dry coated on the vulcanized rubber particles.

18. The method of claim 1, wherein the antiferromagnetic material is sputtered onto the vulcanized rubber particles.

19. The method of claim 1, wherein the antiferromagnetic material is laser sputtered onto the vulcanized rubber particles.

20. The method of claim 1, wherein the antiferromagnetic material is plasma coated onto the vulcanized rubber particles.

21. The method of claim 1, wherein the antiferromagnetic material is supported on a supporting particle.

22. The method of claim 21, wherein the supporting particle has a surface area of 50 m²/g to 1000 m²/g.

23. The method of claim 21, wherein the supporting particle is selected from the group consisting of an oxide, a metal, a refractory material, a ceramic, or a glass.

24. The method of claim 21, wherein the supporting particle is porous.

25. The method of claim 21, wherein the supporting particle is amorphous silica, having a surface area of 160 m²/g.

26. The method of claim 21, wherein the antiferromagnetic material is deposited on the supporting particle by sputtering, laser sputtering, laser ablation, e-beam evaporation, physical or chemical vapor deposition, plasma enhanced chemical vapor deposition, evaporative deposition, reactive deposition, atomic layer deposition, or plasma coating.

27. The method of claim 1, wherein pressure is applied by passing the mixture through a multi-lobe, co-rotating mixer extruder.

28. The method of claim 1, wherein pressure is applied by passing the mixture between two rollers.

29. The method of claim 28, wherein the mixture passes between the two rollers from 3 to 100 times.

30. The method of claim 28, wherein the mixture passes between the two rollers from 3 to 10 times.

31. The method of claim 28, wherein the mixture passes between the two rollers from 3 to 5 times.

32. The method of claim 28, wherein the mixture further comprises one or more of a virgin rubber or a virgin elastomer or a synthetic rubber.

33. The method of claim 28, wherein the two rollers have a nip of 0.007 inches to about 0.050 inches.

34. The method of claim 28, wherein one of the two rollers rotates faster than the other.

35. The method of claim 28, wherein one of the two rollers rotates faster than the other, optionally up to 1.15 times faster than the other.

36. The method of claim 28, wherein one of the two rollers has a variable speed of from 5 to 150 rpm.

37. The method of claim 28, wherein the two rollers have a variable speed of from 5 to 150 rpm.

38. An elastomer prepared by the method of claim 1.

39. The elastomer of claim 38, wherein the elastomer is subjected to cross-linking.

40. The elastomer of claim 38, wherein the elastomer is fabricated into a rubber-containing article.

41. The elastomer of claim 40, wherein the article is a new tire.

42. The elastomer of claim 40, wherein the article is an engineered rubber article.

* * * * *